United States Patent [19]

Trell

[11] 4,452,590
[45] Jun. 5, 1984

[54] MODEL OF BARYON STATES AND A DEVICE OF PRODUCING SUCH MODELS

[76] Inventor: Erik Y. Trell, Regementsgatan 6, S-211 42 Malmö, Sweden

[21] Appl. No.: 337,125

[22] Filed: Jan. 5, 1982

[51] Int. Cl.³ ............................................. G09B 23/20
[52] U.S. Cl. ................................ 434/281; 249/53 R; 425/175
[58] Field of Search .................... 434/300, 276–282; 62/530; 425/175; 249/53

[56] References Cited

U.S. PATENT DOCUMENTS

| | | | |
|---|---|---|---|
| 1,641,139 | 8/1927 | Glennan | 62/530 X |
| 3,188,370 | 6/1965 | Glotzy | 425/175 X |
| 3,276,148 | 10/1966 | Snelson | 434/281 |
| 3,989,220 | 11/1976 | Greenberg | 249/53 R X |
| 4,325,230 | 4/1982 | Driscoll et al. | 62/530 X |

*Primary Examiner*—William H. Grieb

[57] ABSTRACT

A device of producing a model of Baryon states comprises a form permanent body divided into two halves along a plane interface and forming at least one cavity. This cavity is defined by a spheroidal transformation of a homomorphic Euclidean representation of an invariant gauge field symmetry of the Baryon, in a root vector lattice corresponding to the analytical symmetry of the three-dimensional, spherical 0 (3) Lie algebra. The cavity has a symmetry plane in said interface.

3 Claims, 47 Drawing Figures

$\Xi(1530)$ $\Omega^-$
$\Xi - \pi$ $\Lambda^0 - K^-$ $\Lambda'(1520)$

Λ(2100)

Λ(2350)

Σ'(1670)

$\sqrt{5+(1-0.7886)^2}$ $\sqrt{1.5^2+1.5^2+(\sqrt[4]{1/2}-\sqrt{1/2})^2}$

Fig. 34
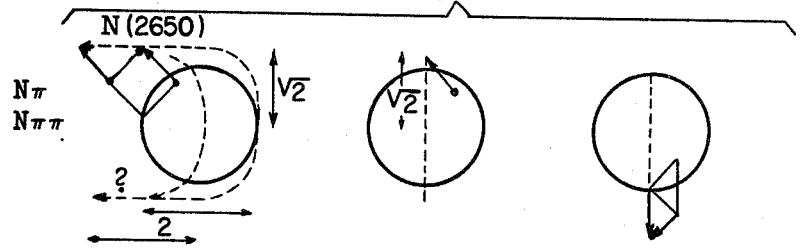
Fig. 35
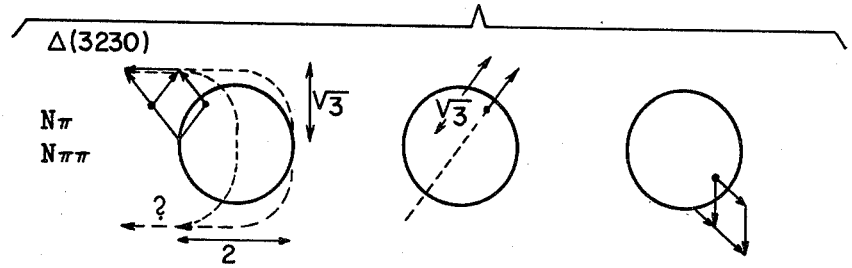
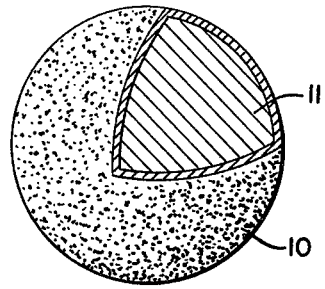
Fig. 36
Fig. 38
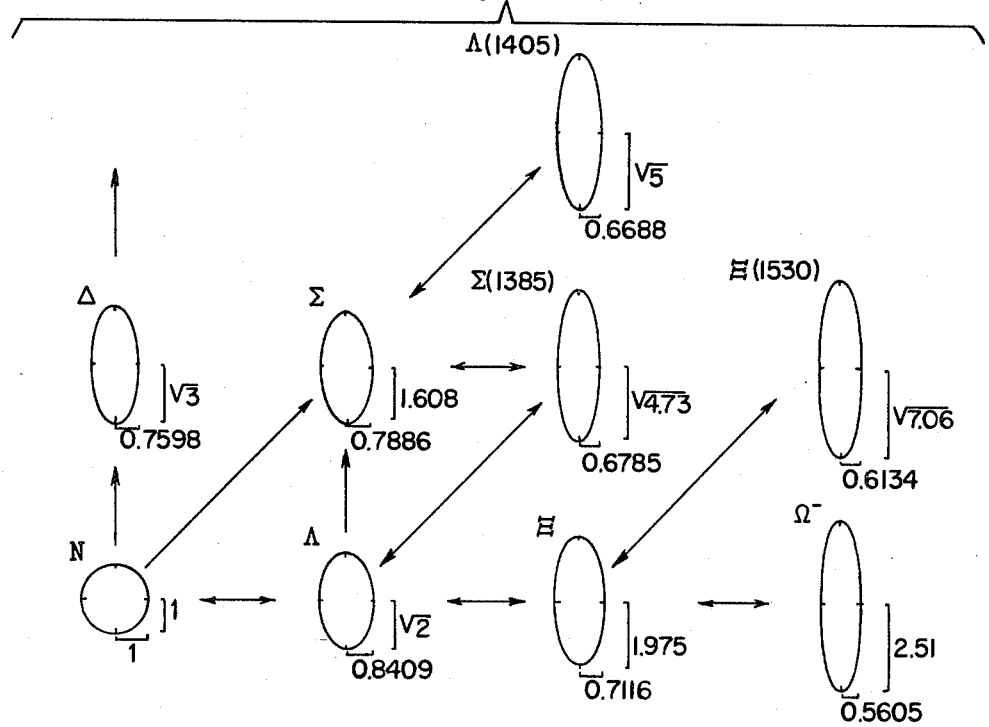

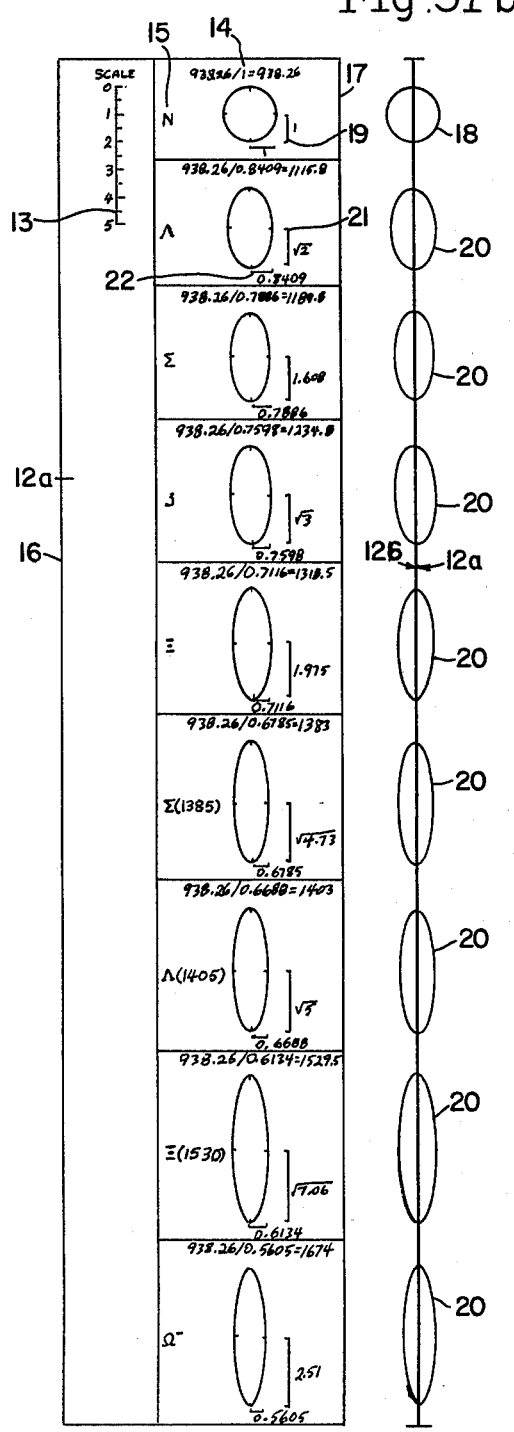
Fig.37a  Fig.37b
Fig.39  ]0.8409
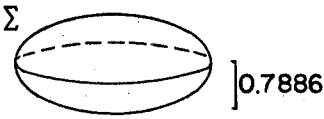
Fig.40  ]0.7886
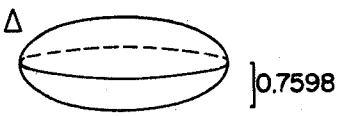
Fig.41  ]0.7598
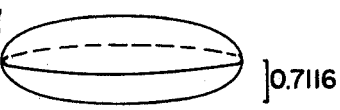
Fig.42  ]0.7116
Fig.43  ]0.6785
Fig.44  ]0.6688
Fig.45  ]0.6134
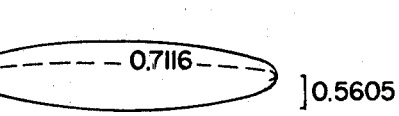
Fig.46  ]0.5605

MODEL OF BARYON STATES AND A DEVICE OF PRODUCING SUCH MODELS

INTRODUCTION

Recent quantum chromodynamical (QCD) and Quark confinement theories have already been established as probably the beginning of a unifying formulation of the Hadron class of elementary particles. There is still no compelling explanation within the framework of these formulations, however, for why the particles within a given family have the masses they do, although it is anticipated that using QCD or equivalent methods one should eventually be able to calculate the Hadron masses. Among the tasks of a fundamental theory of the Hadron expressions is further to account for the apparently infinite number of Hadron states that experimental observations indicate and still trace those states that are more well-defined and/or long-lived; presumably from deductions of preferred analytical realizations. In the model of the Baryon symmetries which will be outlined here, both their masses and their variety can be reproduced by essentially a modified QCD/Quark confinement derivation, utilizing another, but closely related symmetry group than the presently favoured $SU(3)_c$.

QUANTUM CHROMODYNAMICS

QCD represents one of the latest advances in the efforts of formulating local symmetry laws of the Hadrons, which has hitherto been possible only by making the continuous symmetry or general invariance property of the global field into a local invariance by introducing local non-Abelian gauge fields into the theory. In QCD, a representation of the group SU(3) has been used. The theory requires that each flavour of quark (up,down,strange; but also charm, bottom and other possible flavours so that QCD or equivalent models are valid also in these cases) comes in three "colours", and that any constellation of quarks making up a Hadron must have all colours different and complementary so as to combine to a "white" product state. The word "colour" is used only because this prescription is reminiscent of the way visual colours combine. In principle, however, the abstract system of different colour bases projecting out an invariant product state is equivalent with a locally invariant gauge field spanned by linearly independent iso-space coordinate extensions. In the case of Baryons, there are three "positive" colours (red, green, blue) while the anti-Baryons manifest the corresponding, negative, "anti-colours". In the $SU(3)_c$ representation, the three colours of a Baryon (or anti-colours of an anti-Baryon) must transform as a fundamental triplet of SU(3) (implying, among other things, the introduction of eight vector gauge fields called coloured gluons). But the formal quality of the Baryon colours as three linearly independent iso-space extensions may enable a much more simple and immediate three-dimensional symmetry interpretation which may, furthermore, be directly isomorphic with the symmetry properties of the global field.

THE BAG MODEL OF QUARK CONFINEMENT

The framework for this alternative interpretation is offered by the bag model of Quark confinement, which, crudely summarized, states that the three quarks making up a Baryon are permanently confined to a three-dimensional region, or "bubble" of space; and that this volumetric confinement is equivalent with the quantum chromodynamical conditions of three separate colours spanning the Baryon state. If the linear independency and invariant product symmetry of the QCD analytical confinement is thus equivalent with the bag volume confinement symmetry, the latter may be regarded as the homomorphic Euclidean representation of the underlying quantum chromodynamical Lie algebra. The intuitive symmetry of a bubble-like volumetric region of space is a real three-dimensional orthogonal, or spherical, symmetry. The QCD requirement that the three linearly independent Baryon colours always combine to the same, "white" product state is then equivalent with the preservation of volume in the spherically symmetric Euclidean representation. Accordingly, a homomorphic, spherically symmetric bag confinement of the Baryon symmetries may be represented by infinitisemal orthogonal $3\times 3$ matrices with Det=1.

Physical models of different Baryon Bags have not been available so far although there is a need therefor in order to illustrate in an easily comprehensible way different Baryon states in connection with research as well as teaching.

The primary object of the invention is to provide such models and means by which the models can be produced in an easy and cheap way. This object is achieved according to the invention by providing a device of producing a model of Baryon states, comprising a form permanent body divided into two halves along a plane interface and forming at least one cavity defined by a spheroidal transformation of a homomorphic Euclidean representation of an invariant gauge field symmetry of the Baryon, in a root vector lattice corresponding to the analytical symmetry of the three-dimensional, spherical O(3) Lie algebra, said cavity having a symmetry plane in said interface.

In order to illustrate the invention and to explain extensively the background and the theoretical basis thereof reference is made to the following description with reference to the accompanying drawings in which:

FIGS. 23–35 show projections similar to those in FIG. 3 of the N and Δ resonance series;

FIG. 36 is a perspective view with parts broken away of a deformable physical spherical Baryon Bag model of constant volume;

FIG. 37a is a plan view, and FIG. 37b a side view of a volume-preserving geometrical transformation gauge, ruler or mould;

FIG. 38 is a plan view of another embodiment of the gauge, ruler or mould;

FIG. 39 is a perspective view of a Λ Baryon Bag ellipsoid;

FIG. 40 is a perspective view of a Σ Baryon Bag ellipsoid;

FIG. 41 is a perspective view of a Δ Baryon Bag ellipsoid;

FIG. 42 is a perspective view of a Ξ Baryon Bag ellipsoid;

FIG. 43 is a perspective view of a Σ(1385) Baryon Bag ellipsoid;

FIG. 44 is a perspective view of a Λ(1405) Baryon Bag ellipsoid;

FIG. 45 is a perspective view of a Ξ(1530) Baryon Bag ellipsoid; and

FIG. 46 is a perspective view of a Ω Baryon Bag ellipsoid.

THE THREE-DIMENSIONAL ROTATION GROUP

Figure 1:
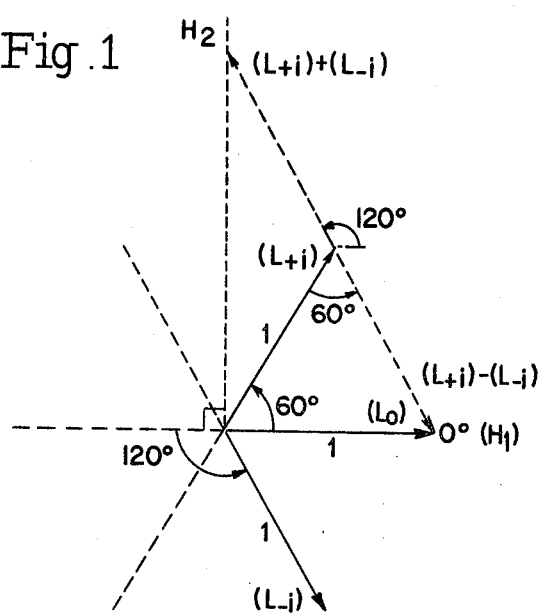
FIG. 1 is an $A_2$ root space diagram.

It seems very reasonable per se that the symmetries of various families of elementary particles be described by infinitesimal Lie algebras (which summarize the commutation relations of different families of infinitesimal generators). Since all Lie algebras possess homomorphic, real Euclidean representations, it also seems plausible to search for Euclidean representations of the elementary particle symmetries as suggested by the bag model of the volumetric confinement of Baryons. O(3), the three-dimensional rotational group, is a volume-preserving (Det=1) continuous transformation group charachterizing a three-dimensional, rotationally symmetric, real Euclidean space. It consists of all three-dimensional rotations and is thus represented by the set of all orthogonal 3×3 matrices. An orthogonal matrix describing a rotation with angle $\omega$ about some direction $n = (\sin \theta \cos \phi, \sin \theta \sin \phi, \cos \theta)$ is given by:

$$g_{rs} = \delta_{rs} \cos \Psi + n_r n_s (1 - \cos \Psi) - \epsilon_{rst} n^t \sin \Psi.$$

Rotations $g_1(\Psi)$, $g_2(\Psi)$ and $g_3(\Psi)$ around the orthogonal, linearly independent x, y and z axes are obtained from this formula by putting the proper values for the polar angles $\theta$ and $\phi$; and are given by the matrices:

$$g_1(\psi) = \begin{pmatrix} 1 & 0 & 0 \\ 0 & \cos\psi & -\sin\psi \\ 0 & \sin\psi & \cos\psi \end{pmatrix} ; g_2(\psi) = \begin{pmatrix} \cos\psi & 0 & \sin\psi \\ 0 & 1 & 0 \\ -\sin\psi & 0 & \cos\psi \end{pmatrix} ;$$

$$g_3(\psi) = \begin{pmatrix} \cos\psi & -\sin\psi & 0 \\ \sin\psi & \cos\psi & 0 \\ 0 & 0 & 1 \end{pmatrix}$$

The infinitesimal matrices, $g_r$, corresponding to these rotations about the orthogonal axes x, y and z are defined by $$g_1(=g_x) = \begin{pmatrix} 0 & 0 & 0 \\ 0 & 0 & -1 \\ 0 & 1 & 0 \end{pmatrix} ; g_2(=g_y) = \begin{pmatrix} 0 & 0 & 1 \\ 0 & 0 & 0 \\ -1 & 0 & 0 \end{pmatrix} ;$$

-continued $$g_3(=g_z) = \begin{pmatrix} 0 & -1 & 0 \\ 1 & 0 & 0 \\ 0 & 0 & 0 \end{pmatrix}$$

They form a Lie algebra with commutation relations $[g_r, g_s] = \epsilon_{rst} g_t$ where $[a,b] = (ab - ba)$ and $\epsilon_{rst}$ are the structure constants of the algebra. The sum matrix of the infinitesimal generators is given by $$\begin{pmatrix} 0 & -1 & 1 \\ 1 & 0 & -1 \\ -1 & 1 & 0 \end{pmatrix},$$

which is an infinitesimal matrix with trace=0 and Det=0. The matrix consists of two complementary parts;

$$= \begin{pmatrix} 0 & 0 & 1 \\ 1 & 0 & 0 \\ 0 & 1 & 0 \end{pmatrix}, \text{ and one negative} = \begin{pmatrix} 0 & -1 & 0 \\ 0 & 0 & -1 \\ -1 & 0 & 0 \end{pmatrix}.$$

Both these submatrices are infinitesimal with trace=0, but they have determinant ±1 and are thus analogous with the QCD requirement of one set of positive and one set of negative basis vectors yielding an identical product state (naively, white=anti-white, while black=0). Like a Baryon and an anti-Baryon do, the two submatrices (which may be expressed in QCD nomenclature as $$\begin{pmatrix} 0 & 0 & G \\ R & 0 & 0 \\ 0 & B & 0 \end{pmatrix} \text{ and } \begin{pmatrix} 0 & -R & 0 \\ 0 & 0 & -B \\ -G & 0 & 0 \end{pmatrix},$$

respectively) also annihilate (or blacken out) each other in the combined matrix expression with Det (=RBG−RBG)=0. When in the following dealing with the Baryons mainly, it is therefore suggested that their ground state in the Euclidean bag volume representation is expressed by the infinitesimal, positive-definite matrix $$\begin{pmatrix} 0 & 0 & 1 \\ 1 & 0 & 0 \\ 0 & 1 & 0 \end{pmatrix}.$$

This matrix is volumetrically identical with the Unit, or Identity, matrix $$\begin{pmatrix} 1 & 0 & 0 \\ 0 & 1 & 0 \\ 0 & 0 & 1 \end{pmatrix},$$

and can be directly interpreted as the basis vectors of a spherically symmetric volume, equivalent with the Unit sphere (the proportionality constant $4/3\pi$ may be eliminated from the representation and all its Unit spheroidal transformations). It is of crucial importance to emphasize that the proposed matrix is the only proper representation of its corresponding Lie algebra (but not of its commutation relations), since the matrix can be directly exponentiated to yield the global symmetry of the field. Similarly, there is only one Baryon that so far seems to be stable, i.e. the proton/neutron iso-doublet (the neutron is practically stable since it decays to the proton only after 920 seconds). The proton/neutron would then provide a ground state Baryon which is fully integrable in the global realization space; and consequently represented by the infinitesimal matrix $$\begin{pmatrix} 0 & 0 & 1 \\ 1 & 0 & 0 \\ 0 & 1 & 0 \end{pmatrix}$$

and volumetrically identical with a Unit sphere. All other Baryons are within periods of $3 \times 10^{-10}$ to less than $10^{-20}$ seconds expelled as it were from their global appearances into, eventually, the neutron-proton state. Their matrix formulations must then differ in their integrability conditions while as infinitesimal matrices still obeying their local spheroidal symmetry laws and the QCD prescription of a local gauge invariance expressed in their volume representation as a determinantial inner product=1. There is also a continuous infinity of such matrices; describing Unit ellipsoidal configurations instead of the ground Unit sphere but retaining the same three-dimensional axis symmetry and Det=1. Thus the spheroidal volume model may account for the continuous infinity of Baryon states which have been indicated as a low base-line yield over a wide energetic range in various scattering, production and formation experiments. But the model must also provide an explanation for the "preferred"; more reproducible, high-yield, well-defined and/or long-lived Baryons that have been found; including their electromagnetical as well as gravitational symmetries.

THE COMMUTATION RELATIONS AND ROOT SPACE DIAGRAM

Such an explanation must reasonably be derived from the algebraical/commutational rather than the geometrical/configurational symmetry laws of the model. The algebraical properties of infinitesimal elements are summarized by the root space diagrams of their adjoint representations. The adjoint algebra is a matrix representation of transformations induced by the infinitesimal generators in the algebra itself as a carrier space. In O(3), with $$g_3 = \begin{pmatrix} 0 & -1 & 0 \\ 1 & 0 & 0 \\ 0 & 0 & 0 \end{pmatrix} ; g_2 = \begin{pmatrix} 0 & 0 & 1 \\ 0 & 0 & 0 \\ -1 & 0 & 0 \end{pmatrix} \text{ and}$$

$$g_1 = \begin{pmatrix} 0 & 0 & 0 \\ 0 & 0 & -1 \\ 0 & 1 & 0 \end{pmatrix},$$

one sees, for instance, that $[g_3, g_2] = -g_1$ and $[g_3, g_1] = +g_2$.

Thus, $\epsilon_{321} = -1$ and $\epsilon_{312} = +1$. If these structure constants are put in row 2 and column 1, and row 1 and column 2, respectively, in the $3 \times 3$ matrix representation of $$\epsilon_3 = ad\, g_3 = \begin{pmatrix} 0 & 1 & 0 \\ -1 & 0 & 0 \\ 0 & 0 & 0 \end{pmatrix} ;$$

it is seen that the matrices of the adjoint representation of the O(3) infinitesimal elements are given by the structure constants of the algebra and hence represent the commutative transformations of the infinitesimal generators acting within the algebra. It is also seen that the adjoint algebra of O(3) is the negative of the O(3) infinitesimal generator matrix representations. Explicitly, the adjoint matrices of O(3) are given by:

$$ad\, g_3 = \begin{pmatrix} 0 & 1 & 0 \\ -1 & 0 & 0 \\ 0 & 0 & 0 \end{pmatrix} ; ad\, g_2 = \begin{pmatrix} 0 & 0 & -1 \\ 0 & 0 & 0 \\ 1 & 0 & 0 \end{pmatrix} \text{ and}$$

$$ad\, g_1 = \begin{pmatrix} 0 & 0 & 0 \\ 0 & 0 & 1 \\ 0 & -1 & 0 \end{pmatrix}$$

which form the O(3) adjoint algebra:

$$\begin{pmatrix} 0 & 1 & -1 \\ -1 & 0 & 1 \\ 1 & -1 & 0 \end{pmatrix}$$

To each element $g_1, g_2, g_3$ ($=g_x, g_y, g_z$) of the Lie algebra of O(3) (L), there thus correspond the linear transformations ad(g) of L into itself. The study of the eigenvalues and eigenvectors of ad(g) and g opens the possibility of a further analysis of the structure of the algebra. It is important to realize that this is evaluated in relation to any single of the adjoint matrix representatives by first solving its individual eigenvalues in the total secular equation of the adjoint algebra (this is also the case in the SU(3) isospin supermultiplet representation of the Baryons which yield the isospin multiplets in relation to a single of the three conjectured quark spin orientations, or "axes").

In O(3), with adjoint algebra $$\begin{pmatrix} 0 & 1 & -1 \\ -1 & 0 & 1 \\ 1 & -1 & 0 \end{pmatrix}$$

and characteristic polynomial;

$$\Delta w = Det(Xad g_1 + Yad g_2 + Zad g_3 - w|) =$$

$$\begin{vmatrix} -w & +z & -y \\ -z & -w & +x \\ +y & -x & -w \end{vmatrix} = -(w^3 + (X^2 + Y^2 + Z^2)w) = 0;$$

$$w^3 = -w(X^2 + Y^2 + Z^2);$$

it is customarily to choose X=0, Y=0 and Z=+1 for the roots (of ad $g_3$): $w_0 = 0$, $w_{+i} = +i$ and $w_{-i} = -i$.

These eigenvalues are not by themselves representing the commutation relations of the algebra. In the general case, this representation is a much more laborious process. However, O(3) is the most simple practical case and its root space can be solved explicitly. In brief, the general procedure is to evaluate the adjoint Lie algebra at one of its elements, which in O(3) is thus ad $g_3$ (=ad $g_z$). The solutions of the secular equation of ad $g_3$; 0, +i and −i, can be shown to possess eigenvectors, $|w_j>$, which are annihilated if the eigenvalues are put in the respective secular matrices of ad $g_3$ (which may then be regarded as eigenoperators, $0w_j$, of the $|w_j>$).

For $w = 0$, $\begin{pmatrix} -0w & 1 & 0 \\ -1 & -0w & 0 \\ 0 & 0 & -0w \end{pmatrix} \begin{pmatrix} 0 \\ 0 \\ 1 \end{pmatrix} = 0,$ for $w = +i,$ $\begin{pmatrix} -i & 1 & 0 \\ -1 & -i & 0 \\ 0 & 0 & -i \end{pmatrix} \begin{pmatrix} i \\ -1 \\ 0 \end{pmatrix} = 0,$ for $w = -i,$ $\begin{pmatrix} +i & 1 & 0 \\ -1 & +i & 0 \\ 0 & 0 & +i \end{pmatrix} \begin{pmatrix} i \\ +1 \\ 0 \end{pmatrix} = 0$ To these column eigenvectors correspond the following eigenfunctions, $f(w_j)$:

$f(w_0) \times |w_0> = 0; \begin{pmatrix} 0 & 1 & 0 \\ -1 & 0 & 0 \\ 0 & 0 & 0 \end{pmatrix} \times \begin{pmatrix} 0 \\ 0 \\ 1 \end{pmatrix} = 0;$ $f(w_0) = \begin{pmatrix} 0 & 1 & 0 \\ -1 & 0 & 0 \\ 0 & 0 & 0 \end{pmatrix} = ad\, g_3$ $f(w_{+i}) \times |w_{+i}> = 0; \begin{pmatrix} 0 & 0 & -1 \\ 0 & 0 & -i \\ 1 & +i & 0 \end{pmatrix} \times \begin{pmatrix} i \\ -1 \\ 0 \end{pmatrix} = 0;$ $f(w_{+i}) = \begin{pmatrix} 0 & 0 & -1 \\ 0 & 0 & -i \\ 1 & i & 0 \end{pmatrix}$ Similarly, $f(w_{-i}) = \begin{pmatrix} 0 & 0 & 1 \\ 0 & 0 & -i \\ -1 & i & 0 \end{pmatrix}$ The eigenfunctions, or root forms, are the solutions to the equation:

$(0w_j)|w_j> = f(w_j)|w_j> = 0,$ where the $f(w_j)$ express the commutation relations of the Lie algebra as polynomials on the whole adjoint algebra instead as coefficients in the single adjoint matrix representations. The root forms span the root function spaces $L_{+i}$, $L_{-i}$ and $L_0$. Their importance is that they are starting points for an Euclidean representation of the commutation relations of the algebra by various methods. The most straightforward is by direct operations of the obtained matrix representations of the root forms. With the commutation operation defined as before as $[a,b] = (ab-ba)$, one sees, for instance, that $\tfrac{1}{2}i\,[L_{+i},\,L_{-i}] = L_0$, since $\tfrac{1}{2}i(f(w_{+i}) \times f(w_{-i})) -$ $\tfrac{1}{2}i(f(w_{-i}) \times f(w_{+i})) = 1\,f(w_0)$ -continued $\tfrac{1}{2}i\begin{pmatrix} 0 & 0 & -1 \\ 0 & 0 & -i \\ 1 & i & 0 \end{pmatrix}\begin{pmatrix} 0 & 0 & 1 \\ 0 & 0 & -i \\ -1 & i & 0 \end{pmatrix} - \tfrac{1}{2}i\begin{pmatrix} 0 & 0 & 1 \\ 0 & 0 & -i \\ -1 & i & 0 \end{pmatrix}\begin{pmatrix} 0 & 0 & -1 \\ 0 & 0 & -i \\ 1 & i & 0 \end{pmatrix} =$ $\tfrac{1}{2}i\begin{pmatrix} 1 & -i & 0 \\ i & 1 & 0 \\ 0 & 0 & 2 \end{pmatrix} - \tfrac{1}{2}i\begin{pmatrix} 1 & i & 0 \\ -i & 1 & 0 \\ 0 & 0 & 2 \end{pmatrix} = \begin{pmatrix} \tfrac{1}{2}i\tfrac{1}{2} & 0 \\ -\tfrac{1}{2}\tfrac{1}{2}i & 0 \\ 0 & 0i \end{pmatrix} -$ $\begin{pmatrix} \tfrac{1}{2}i & -\tfrac{1}{2} & 0 \\ +\tfrac{1}{2} & \tfrac{1}{2}i & 0 \\ 0 & 0 & i \end{pmatrix} = \begin{pmatrix} 0 & 1 & 0 \\ -1 & 0 & 0 \\ 0 & 0 & 0 \end{pmatrix} = f(w_0).$ The example shows, that the root function spaces $L_{+i}$ and $L_{-i}$ commute into $1 \times L_0$ through a numerical coefficient which is equivalent with $\tfrac{1}{2}$. However, an Euclidean root vector representation of the commutation relations furthermore requires the introduction of a metric in the space. This is offered almost spontaneously and according to the standard definitions of scalar product in a complex space by the fact that the matrices $f(w_{+i})$ and $f(w_{-i})$ used in the multiplications ab and ba above are transposed and complex conjugated in relation to each other, i.e.

$(f(w_{+i}))^* = \begin{pmatrix} 0 & 0 & 1 \\ 0 & 0 & -i \\ -1 & +i & 0 \end{pmatrix}^* = \begin{pmatrix} 0 & 0 & -1 \\ 0 & 0 & -i \\ 1 & +i & 0 \end{pmatrix} = f(w_{-i})$ Similarly, $(f(w_{-i}))^* = f(w_{+i})$. The product matrices (ab) and (ba) hence form the standard matrix representations of the scalar products, $(f(w_{+i}) \mid f(w_{+i})^*) = \begin{pmatrix} 1 & -i & 0 \\ i & 1 & 0 \\ 0 & 0 & 2 \end{pmatrix}$ and $(f(w_{-i}) \mid f(w_{-i})^*) = \begin{pmatrix} 1 & i & 0 \\ -i & 1 & 0 \\ 0 & 0 & 2 \end{pmatrix},$ respectively. The same scalar product of $f(w_0) = (f(w_0) \mid f(w_0)^*) =$ $\begin{pmatrix} 0 & 1 & 0 \\ -1 & 0 & 0 \\ 0 & 0 & 0 \end{pmatrix}\begin{pmatrix} 0 & -1 & 0 \\ 1 & 0 & 0 \\ 0 & 0 & 0 \end{pmatrix} = \begin{pmatrix} 1 & 0 & 0 \\ 0 & 1 & 0 \\ 0 & 0 & 0 \end{pmatrix}.$ The root space diagram of the algebra now follows from a study of how these metric functions of $L_{+i}$, $L_{-i}$ and $L_0$ may be combined to reproduce the algebra's commutation relations. It is only necessary to make use of a two-dimensional, plane representation space corresponding to the upper left-hand submatrix of the metric tensor matrices. These submatrices represent the plane in which all the tensor matrices share coefficients. The plane can be regarded as the Euclidean xy-plane, since the metric space is next made real and Euclidean by the so called Cartan metric tensor; which is equal with the trace of the metric tensor matrices of $L_{+i}$, $L_{-i}$ and $L_0$ = trace $\begin{pmatrix} 1 & -i \\ i & 1 \end{pmatrix}$ = 2; trace $\begin{pmatrix} 1 & i \\ -i & 1 \end{pmatrix}$ =

2 and trace $\begin{pmatrix} 1 & 0 \\ 0 & 1 \end{pmatrix}$ = 2 in all of them.

The ordinary norm of the metric $2=\sqrt{2}$ (and this root vector length can be used to map the algebra in the $B_2$ and $C_2$ root spaces). But a more common normalization prescription in the representation of Lie algebras is the relative length of the root vectors to each other; $a \times a/b \times b$, which for all the three metric tensors of O(3) is $2/2=1$.

With these normalized root vectors, a considerable simplification in the description of the root forms of O(3) as real, Unit vector quantities in a 2-dimensional Euclidean space has been achieved. The representation also contains the commutation relations of the algebra by means of (the direction cosines of) the orientations of the Unit vectors which transmute into each other in the same manner as the algebra.

For vectors of the same length, the only possible commutating orientations are the sides of an equilateral triangle, according to the relation; $\frac{1}{2} \times 1 - \frac{1}{2} \times 1 = 1 \times 1 = \frac{1}{2} + \frac{1}{2} = 1$, where the coefficients $\frac{1}{2}$, $-\frac{1}{2}$ and 1 arise as the angle cosines of 60°, 120° and 0°. The corresponding root space diagram is $A_2$ (FIG. 1). The commutations $[L_{+i}, L_{-i}]$ and $[L_{-i}, L_{+i}]$ to $L_0$ can be directly red from the diagram as the numerical relation: $\pm(\cos 60° \times 1 - \cos 120° \times 1 = \cos 0° \times 1)$, and it is also seen that the commutation of any of the vectors with itself is to 0. Finally, it can be seen that the superposition of $|L_{+i}|$ and $|L_{-i}|$ may lead to the $\pm 90°$ ($\cos = 0$), $H_2$ axis of the $A_2$ root space diagram (FIG. 1). This is not a commutation, however, and does not belong to the primary operations of the algebra. However, there is one further symmetry property of O(3) which can be given a simple diagrammatic representation and which is connected with the basic relation of the $A_2$ root space diagram to the special unitary groups. Direct matrix operations show that $$\begin{pmatrix} 0 & 1 & 0 \\ -1 & 0 & 0 \\ 0 & 0 & 0 \end{pmatrix} \begin{pmatrix} 0 & 0 & -1 \\ 0 & 0 & -i \\ 1 & i & 0 \end{pmatrix} - \begin{pmatrix} 0 & 0 & -1 \\ 0 & 0 & -i \\ 1 & i & 0 \end{pmatrix} \begin{pmatrix} 0 & 1 & 0 \\ -1 & 0 & 0 \\ 0 & 0 & 0 \end{pmatrix} =$$

$$\begin{pmatrix} 0 & 0 & -i \\ 0 & 0 & 1 \\ i & -1 & 0 \end{pmatrix} = i \begin{pmatrix} 0 & 0 & -1 \\ 0 & 0 & -i \\ 1 & i & 0 \end{pmatrix}$$

But $$\begin{pmatrix} 0 & 0 & -i \\ 0 & 0 & 1 \\ i & -1 & 0 \end{pmatrix}$$

is a member of $L_{+i}$ since $f(w_{+i})$ and $i \times f(w_{+i})$ commute into 0

$$\left( \begin{pmatrix} 0 & 0 & -1 \\ 0 & 0 & -i \\ 1 & i & 0 \end{pmatrix} \begin{pmatrix} 0 & 0 & -i \\ 0 & 0 & 1 \\ i & -1 & 0 \end{pmatrix} - \begin{pmatrix} 0 & 0 & -i \\ 0 & 0 & 1 \\ i & -1 & 0 \end{pmatrix} \begin{pmatrix} 0 & 0 & -1 \\ 0 & 0 & -i \\ 1 & i & 0 \end{pmatrix} = \right.$$

-continued $$\left. \begin{pmatrix} 0 & 0 & 0 \\ 0 & 0 & 0 \\ 0 & 0 & 0 \end{pmatrix} \right)$$

and the commutation relations of O(3) ($[g_r, g_s] = \epsilon_{rst} g_t$) imply that $[g_r, g_r] = 0$; i.e. that elements of the algebra which commute into 0 belong to the same subset.

The above relations demonstrate that the matrices $$\begin{pmatrix} 0 & 0 & -1 \\ 0 & 0 & -i \\ 1 & i & 0 \end{pmatrix} \text{ and } \begin{pmatrix} 0 & 0 & -i \\ 0 & 0 & 1 \\ i & -1 & 0 \end{pmatrix}$$

both belong to $L_{+i}$ and commute into each other through $L_0$. Simiarly, there are two elements of $L_{-i}$, each of which is mapped into the other by commutation with $L_0$, while there is no single-step commutation from the subspace $L_{+i}$ into the subspace $L_{-i}$, and vice versa.

Figure 2A:
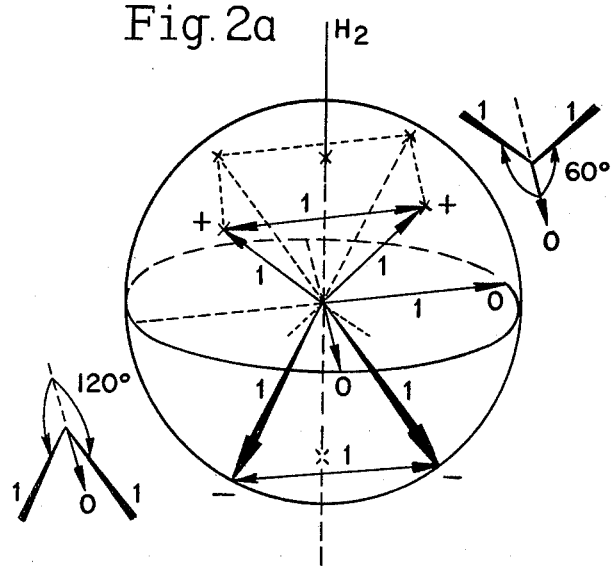
FIG. 2 is a three-dimensional Euclidean root space diagram of O(3)
Figure 2B:
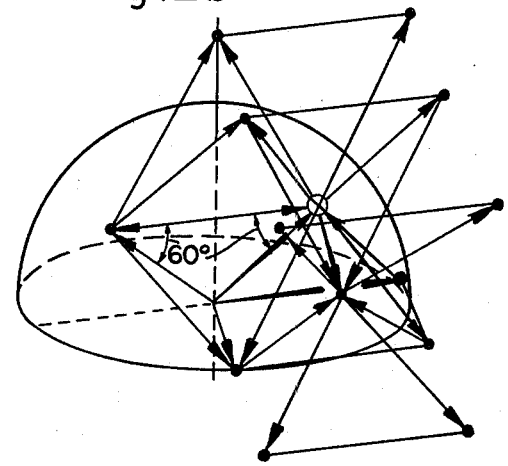
Figure 2C:
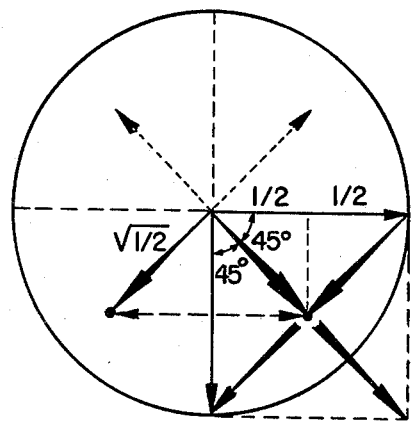

The double-valuedness of $L_{+i}$ and $L_{-i}$ implies a duplication of the plane $A_2$ root space diagram into two planes of each vector inclinated 60° in relation to each other. Within each plane, the commutation is still two-dimensional but the two planes themselves must be obliquely oriented from the vertical axis so that the combined symmetry of the root space of O(3) including the double root vector representation is three-dimensional (FIG. 2a). As shown for the $|L_{+i}|$ and $|L_0|$ subspaces, one can visualize the two forms of $|L_{+i}|$ as the end-points of Unit, radius vectors on the surface of a Unit sphere, commutating between each other over a straight $|L_0|$ Unit vector interval (FIG. 2a–b). This picture of the complete O(3) root space as duplicated, two-dimensional vector planes in a sphere offers a faithful diagrammatic reproduction of the well-known algebraical representation of the spherically symmetric O(3) by double-valued, two-dimensional complex matrices of the Unitary Spin group, SU(2). Another interesting feature of the spherical diagram is that the projection on its horisontal plane of the commutation in and between the $|L_{+i}|$ and $|L_0|$ root vector planes results in the $C_2$ root space diagram (FIG. 2c). This relates predominantly to the special orthogonal groups.

THE BARYON SYMMETRIES

The Nucleon

Figure 2D:
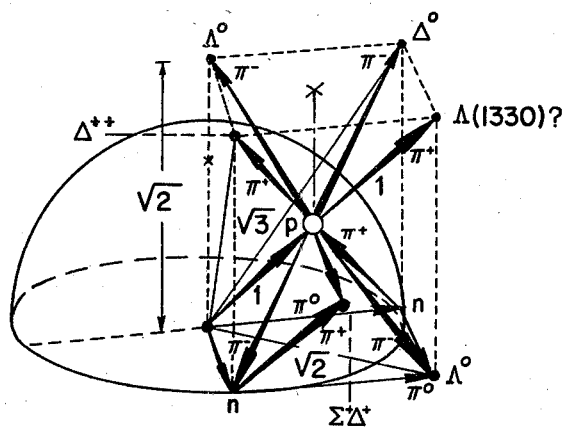
Figure 3:
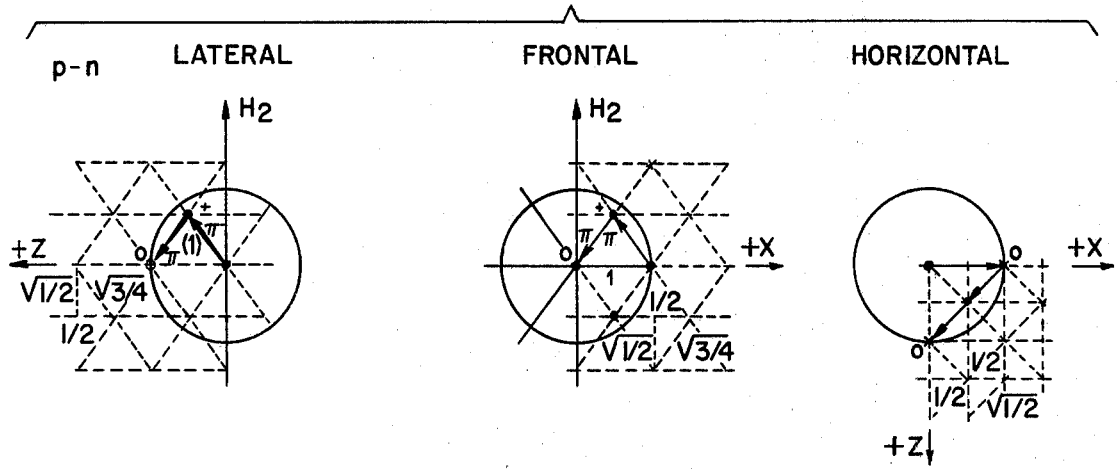
FIG. 3 shows lateral, frontal and horizontal plane projections of the proton and neutron.
Figure 4:
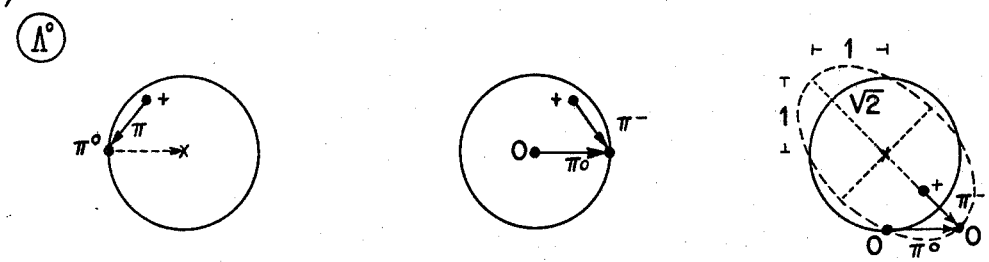
FIG. 4 shows projections similar to FIG. 3 of the Λ Hyperon unfolding.

Both the algebraical and geometrical properties of the proposed infinitesimal volume confinement of Baryons may thus be represented by Unit vector quantities in an Euclidean, spherically symmetric space. The geometrical (infinitesimal generator) and algebraical (adjoint algebra) representations are mirror-images of each other. The very simple idea to merge the algebraical and geometrical symmetries is that the former from the inherent analytical nature of the local gauge fields of elementary particles are directly reflected in and manifested by any linearly independent Euclidean coordinate extension spanning the Baryon's QCD-homomorphic bag manifestation. Since the QCD prescriptions allow no negative vectors in the Baryons, the analytically dictated orientations of a single basis vector in the Nucleon's Unit sphere ground state should correspond to the $|L_{+i}|$ and $|L_0|$ vectors (and in the anti-Nucleon the $|L_{-i}|$ and $|L_0|$ vectors) in the spherical O(3) root space diagram (FIG. 2–3). It seems reasonable that an analytical orientation of the linearly independent coordinate axes of the Baryon observables would ensure their integrability in the global realization space. The simple, orthogonal axis symmetry proposed for the spheroidal bag configuration would provide that if any single basis vector is analytically aligned, the others are as well. It is also in the sense of the representation of Lie algebras, that they are evaluated for a single of the infinitesmal generators. Like in the SU(3) supermultiplet model, it may then be choosen to examine the analytical degeneracy of the Baryons in relation to its t-isospin axis. Also like in SU(3), it may be assumed that the direction of this axis is along the electromagnetical charge (Q) axis.

The $|L_{+i}|$ basis vector inclination then corresponds to the $Q=+1$, Proton state, while the $|L_0|$ basis vector inclination corresponds to the $Q=0$, Neutron state. Both represent Unit basis vector, spherical states (the slight mass difference will be briefly considered later). They may commute into each other through a negatively ($|L_{+i}| \rightarrow |L_0|$) or positively ($|L_0| \rightarrow |L_{+i}|$) oriented, Unit root vector interval over the surface of the representation sphere (FIG. 2–3). These Unit difference vectors, which are of the same length and inclinations as the root vectors of the algebra, may be identified as $\pi^-$ and $\pi^+$, respectively. Similarly, a $-|L_0|$, straight Unit vector commutation, for instance, between the two forms of $|L_{+i}|$, may be identified as $\pi^0$ (FIG. 2b–d). Since the spherical O(3) root space contains only (the two varieties of) $|L_{+i}|$ and $|L_0|$ commuting with each other in the positive half of the diagram, there should be only two varieties of the positive-definite spherical Baryon bag ground state, corresponding to the Proton and the Neutron.

The Lamda Hyperon

No matter how much Baryons are hit by various elementary particle Phenomena, they could not be smashed out of a bag existence to which they are permanently confined. But they might be collided/accelerated away from the confrontation, or, when the impact is suitable, they might be deformed so as to preserve their local gauge invariance. There is a continuous infinity of successive ellipsoidal transformations of the sphere which would preserve both the determinantial inner product and the spheroidal axis symmetry according to the volume formula: $(4/3\pi) \times a \cdot b^2 = (4/3\pi) \times 1$ or $(4/3\pi) \times a \cdot b \cdot c = (4/3\pi) \times 1$; where $(4/3\pi) \times 1^3 = (4/3\pi) \times 1$ obviously is the spherical ground state ellipsoid. However, there is a tendency for some states to be more (or less) reproducible and precisely defined. In the present model they may be traced exhaustively, including their sometimes bewildering variety of generative and decay channels, by ellipsoidal transformations preferentially taking place along the analytical vector orientations of the O(3) root space.

It is conjectured, that the infinitesimal gauge field symmetry continues in a lattice-like fashion in the neighbourhood outside the spherical ground state and that the major semiaxis of ellipsoidally transformed Baryons are very strongly inclined to develop over the Unit vector intervals defined for the algebra in the root space diagram. When one of the Baryon's Euclidean volume basis vectors is unfolded in the lattice it would by definition be the t-isospin axis since the unfolding over the available +, 0 and also − root vector ladders would clearly take it stepwise in and between discrete levels of the electromagnetical charge. And if the ellipsoid is further evoluted, this should continue in the stepwise fashion from limit points of the already outlined major semiaxes of the preceeding stages; most naturally their end-points but in some cases possibly also their ellipsoidal focal points. Similarly, the new major semiaxes might project back to various extremal points of underlying ellipsoid states; simply from the statistical point of wiew that where there are new possible constellations of limit points between which major semiaxes may be extended, there are new possible ellipsoid configurations which might be more or less probably realized given the appropriate transformation impacts.

From the $|L_0|$, Neutron ground state, a single $\pi^-$ Unit step would lead into a negative, anti-Baryon major semiaxis while from the $|L_{+i}|$, Proton ground state two $\pi^-$ Unit steps would be required. But the shortest and most simple root vector evolution from the Nucleon is to a neutral state; by a $\pi^0$ unfolding from the Neutron root vector end-point or a $\pi^-$ unfolding from the Proton root vector end point to a confocal margin point in the Q=0 level (FIG. 2,4). If this point connects with the Baryon centre, the resulting major semiaxis length is $\sqrt{1^2+1^2}=\sqrt{2}$. If the ellipsoid described by this major semiaxis must preserve the invariant Unit volume, the minor semiaxes must be reciprocally contracted, and the most simple volume formula of the ellipsoid, corresonding to a symmetrical contraction of the minor semiaxes, would be $(4/3\pi) \cdot \sqrt{2} \cdot b^2 = (4/3\pi) \cdot 1$; $\sqrt{2} \cdot b^2 = 1$; $b^2 = 1/\sqrt{2} = \sqrt{\frac{1}{2}}$; $b = \sqrt[4]{\frac{1}{2}} = 0.8408964$. It is an empirical fact that the observed mass number of $\Lambda^0$, which is suggested to be represented by this ellipsoid, can be exactly reproduced from the calculated minor semiaxis length.

In analogy with associating the electromagnetical charge with the t-isospin axis, the mass is simply associated with one of the other orthogonal, minor semiaxes of the Baryon. Intuitively, the more compressed this isospin axis, the more retardation, or inertia of its expression. Furthermore, the Baryon mass numbers equal and are expressed as the energy levels at which the various Baryon states occur. In the geometrical Bag volumes, the impact energies would correspond to the compression or "flattening" of the Bags in the transformation. Then, the minor semiaxis of the ellipsoids would be inversely proportional to the energy levels and the associated mass numbers. The lowest mass number Nucleon form, the stable Proton, should be the groundstate, perfect sphere with all semiaxes exactly=1. Hence its mass should be the recorded Proton mass, 938.26 MeV times 1/1. But in $\Lambda^0$ with minor semiaxes=0.8408964, the mass should be $938.26 \cdot 1/0.8408964 = 1115.8$ MeV according to the same principle. This is indeed virtually identical with the observed $\Lambda^0$ mass of 1115.6 MeV.

One thus directly arrives at the $\Lambda^0$ state as the first feasible ellipsoid transformation of the Baryon Bag volume, with major semiaxis=$\sqrt{2}$ and minor semiaxes=$\sqrt[4]{\frac{1}{2}}$, or, in matrix formulation (and eliminating the proportionality constant $$(4/3 \pi): \begin{pmatrix} \sqrt[4]{\tfrac{1}{4}} & 0 & \sqrt{2} \\ \sqrt[4]{\tfrac{1}{4}} & 0 & 0 \\ 0 & \sqrt[4]{\tfrac{1}{4}} & 0 \end{pmatrix}.$$

This matrix has determinant $= \sqrt[4]{\tfrac{1}{2}} \cdot \sqrt[4]{\tfrac{1}{2}} \cdot \sqrt{2} = 1$.

In the $\Lambda^0$ Hyperon, resulting from the most simple possible ellipsoid transformation in the lattice diagram with both minor semiaxes symmetrically contracted, there is no problem which one of them is associated with the mass number. In possible states with minor semiaxes of unequal length (which may occur when an ellipsoid transformation developing from an underlying state retains one of the minor semiaxes of this), the fact that the new state is associated with a new mass number truistically implies that the changing mass is associated with the minor semiaxis that changes in the transformation. It is even tempting to speculate that the impact causing the ellipsoid transformation acts primarily along the gravitational axis so as to "flatten" and elongate, as it were, the analytical continuation of the Baryon state represented by its t-isospin axis. This is one way of physically interpreting the inverse relationship between the mass and one of the minor semiaxes normal to the t-isospin major semiaxis. In principle, the idea is also not entirely different from, for instance, the String model of Quark confinement, where the gravitational quantum numbers are likewise associated with the increasingly elongated spinning Strings in successive levels of Quark orbital exitation. But in the present, volume-preserving version of Baryon Bag reconfigurations, the masses come directly and can be calculated in detail from the minor semiaxis that changes in the transformation. However, only explicit calculations of the mass numbers can therefore indicate whether the model is of relevance. Another test of the validity of the model is of course whether all feasible operations in the diagram yield the observed spectrum of Baryon states and channels; all of them and no others. It is interesting that also the next possible unfoldings in the root space lattice seem to correspond exactly with the two nex-lowest mass number states, viz. the $\Sigma$ Hyperon and the $\Delta$ Resonance:

The Sigma Hyperon and the Delta Resonance

Figure 5:
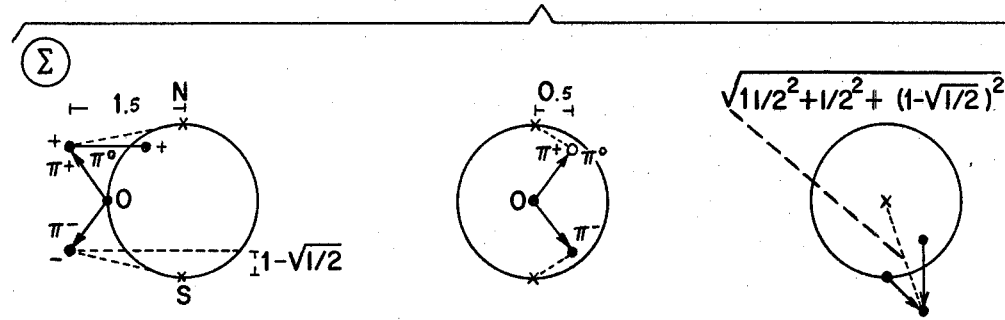
FIG. 5 shows as in FIG. 3 the Σ Hyperon unfolding.
Figure 6:
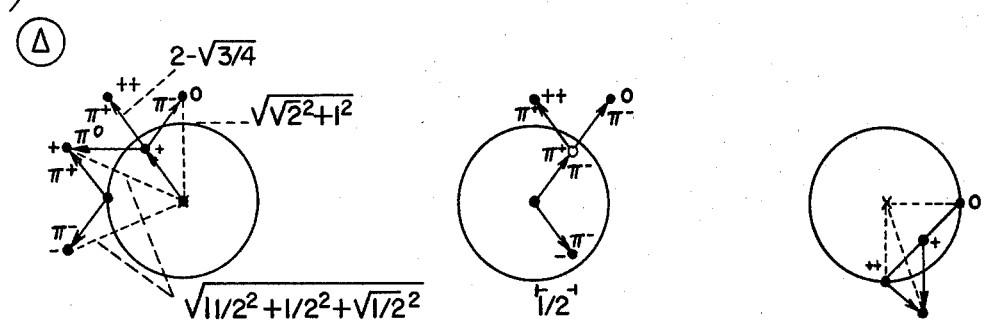
FIG. 6 shows as in FIG. 3, the Δ Hyperon unfolding.

FIG. 5–6 shows the next possible pion transitions from the Nucleon. Four charge levels may be reached; $++$, $+$, 0 and $-$; which is in full agreement with the known channels of the $\Delta$ Hyperon ($p-\pi^+$; $p-\pi^0$ and $n-\pi^+$; $p-\pi^-$, $n-\pi^0$ and $\bar{p}-\pi^+$; and $n-\pi^-$ and $\bar{p}-\pi^0$). From all these end-points, major semiaxes to the centre of the Nucleon would have length $\sqrt{3}$ and the volume-preserving ellipsoid transformations would have minor semiaxes of length $\sqrt[4]{\tfrac{1}{3}}$ and matrix (FIG. 6)
$$\begin{pmatrix} \sqrt[4]{\tfrac{1}{3}} & 0 & \sqrt{3} \\ \sqrt[4]{\tfrac{1}{3}} & 0 & 0 \\ 0 & \sqrt[4]{\tfrac{1}{3}} & 0 \end{pmatrix}.$$

The mass number of the $\Delta$ states would be $1\sqrt[4]{\tfrac{1}{3}} \cdot 938.26 = 1234.82$ MeV, which compares well with the recorded $\Delta$ mass range of 1230–1236.

From the $+$ and $-$ end-points one can also imagine a major semiaxis projection to the Nucleon's periphery instead of the centre (FIG. 5). This would correspond to the observed $\Sigma^+$ and $\Sigma^-$ states with transition channels $p-\pi^0$ or $n-\pi^+$ and $n-\pi^-$, respectively. As in reality, there is no $\Sigma^{++}$ projection and $\Sigma^0$ cannot be reached by a pion channel (but by a $\Lambda-\nu$ channel, which may also be reproduced in the diagram, but is not illustrated here). The major semiaxis corresponding to the projections would have length $\sqrt{(1.5)^2 + (0.5)^2 + (1-\sqrt{0.5})^2} = \sqrt{2.58479} = 1.60804$ (FIG. 5). The minor semiaxes would then be $1/1.60804 = 0.788591$, and the $\Sigma$ mass would be $1/0.788591 \cdot 938.26 = 1189.8$ MeV. This is again virtually identical with the registered, $\Sigma^+$ mass of 1189.4. The tendency in both $\Delta$ and $\Sigma$, and in all other Hyperons with multiple charge states, to a minute but apparently periodical increase of the mass number with decreasing electromagnetical charge is enigmatic, but may have a systematic explanation, e.g. from a slight obliqueness of the root space diagram by its perpetual propagation so that margin points in the $Q=+$ half-plane are somewhat nearer the projective centre than in the negative half-plane.

The Xi Hyperon, the Sigma(1385) resonance and the Lamda(1405) resonance

Figure 7:
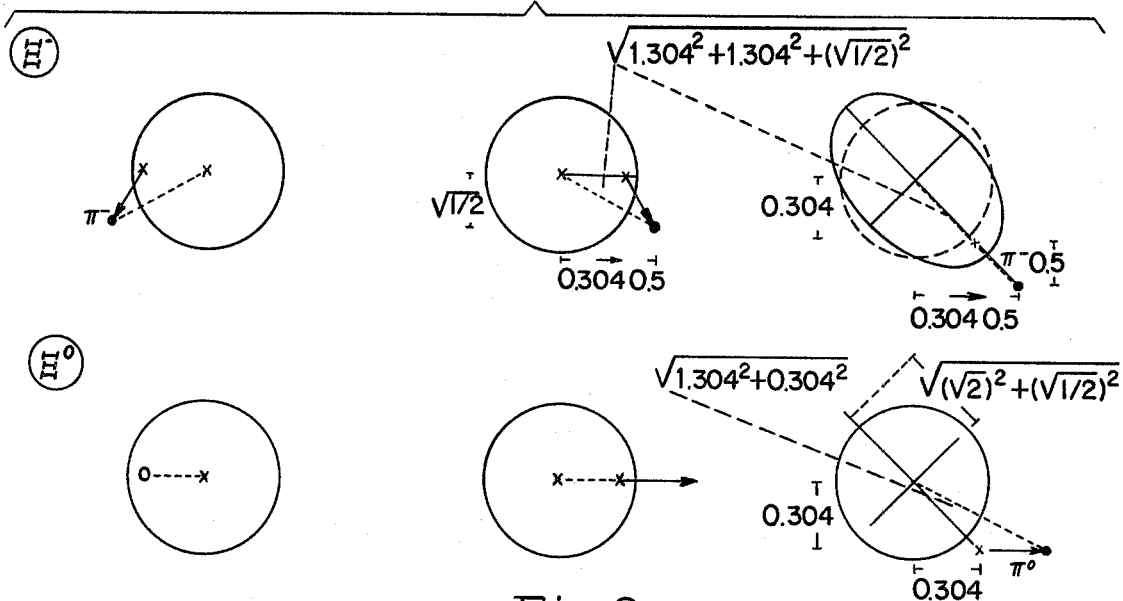
FIG. 7 shows as in FIG. 3 the Ξ Hyperon unfolding.

From their decays, it may be inferred that $\Xi, \Sigma(1385)$ and $\Lambda(1405)$ are all third generation hyperons arising via already ellipsoidally transformed secondary states. Their unfoldings should therefore map to the respective ellipsoidal limit points and not directly to the Nucleon. The $\Xi$ Hyperon uniquely relates to $\Lambda^0$ with the same decay mode and, consequently, the same spin parity. It is suggested in the lattice diagram as an "interior", $\pi^-$ or $\pi^0$ unfolding from the nearest ellipsoidal limit point which can be found outside the ground Nucleon sphere, which is the ellipsoidal focal point in the $\Lambda^0$ horizontal plane (FIG. 7). This would establish major semiaxes of length $\sqrt{(1.804)^2 + (0.804)^2}$ and $\sqrt{(1.304)^2 + (1.304)^2 + (\sqrt{0.5})^2}$, which in both cases equal $\sqrt{3.90} = 1.975$ to the Nucleon centre. The minor semiaxes would then be $\sqrt{1/1.975} = 0.7116$, and the $\Xi$ mass number would be $1/0.7116 \cdot 938.26 = 1318.5$. This is in good agreement with the observed $\Xi^0$ mass of 1314.9 and $\Xi^-$ mass of 1321.3.

Figure 8:
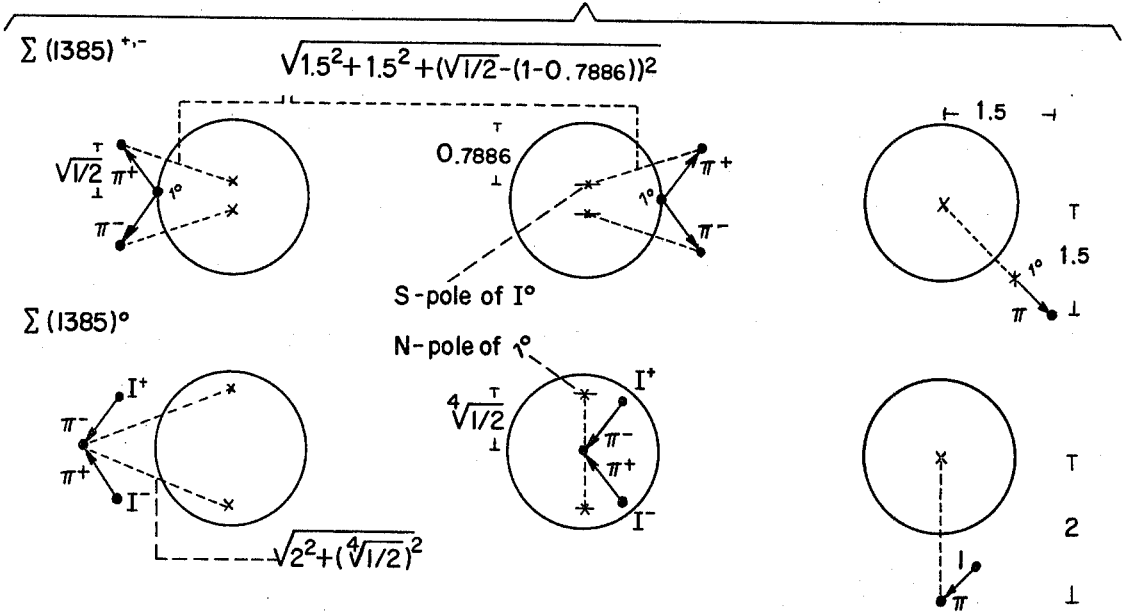
FIG. 8 shows as in FIG. 3 the Σ(1385) Hyperon unfolding.

$\Sigma(1385)$ presents a different picture. It is a $J^p +3/2$ resonance, which according to the known channels can be visualized as "external" $\pi^+$ or $\pi^-$ unfoldings from the $\Lambda^0$ or $\Sigma(1189)$ apices (FIG. 8a–b), and which also decay back to either of these parent modes. Both $+$, $-$ and 0 charge states may thus occur. In analogy with $\Sigma(1189)$, a projection of these unfoldings to reciprocal poles of the underlying states can easily be realized; i.e. to $\Sigma(1189)$ (FIG. 8a) or to $\Lambda^0$ (FIG. 8b). In both cases, the major semi-axis length would be in the order of $\sqrt{4.75} - \sqrt{4.71}$, the minor semiaxis between 0.678–0.679 and the masses 1382.2–1385, which fits well with the actual mass range of 1383–1386 MeV.

Figure 9:
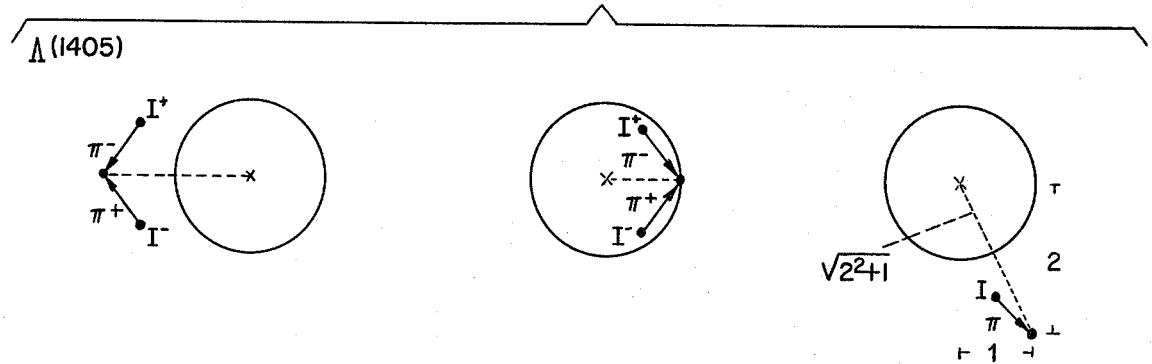
FIG. 9 shows as in FIG. 3 the Λ(1405) Hyperon unfolding.

In $\Lambda(1405)$, only $\Sigma(1189)-$ charged pion modes have been seen, which can be immediately traced in the lattice system, too (FIG. 9). If this major semiaxis termination is projected like in $\Lambda(1115)$ not to the periphery but to the centre of the root space diagram, the resulting length is $\sqrt{5}$, the minor semiaxis length $= \sqrt[4]{1/5}$, and the consequential mass number $= 1/\sqrt[4]{1/5} \cdot 938.26 = 1403$. Again, there is a virtually exact coincidence between successive unfolding possibilities in the geometrical Bag transformation lattice and the recorded periodicities, charge and channel symmetries as well as mass expressions of the really occuring Baryons.

The Xi resonances, $\Omega^-$

Figure 10:
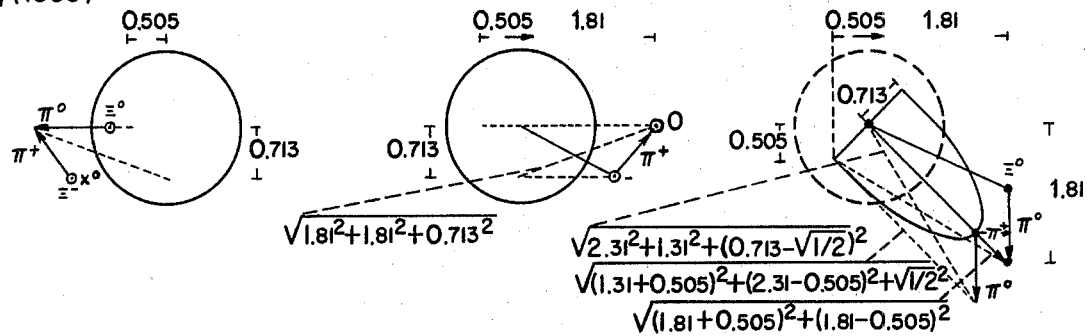
FIG. 10 shows as in FIG. 3 the Ξ(1530) Hyperon unfolding.

In a similar vein as $\Sigma(1385)$ relates to $\Lambda^0$ and $\Sigma$, $\Xi(1530)$ should represent transitions from the apices of the $\Xi^0$ and $\Xi^-$ ellipsoids, projecting back against other limit points of these. FIG. 10 shows a number of feasible modes and sterigraphical calculations of the resulting $\Xi(1530)^0$ and $\Xi(1530)^-$ major semiaxis lengths. All are in the order of $\sqrt{7.06}$ with minor semiaxes $\sim 0.6134778$ and masses $1/0.6134778 \cdot 938.26 = 1529.5$. It is also possible to obtain approximate parallells to the varying mass spectrum of diverse channels of the $\Xi(1820)$ and $\Xi(1930)$ resonance accumulations; through matching apical developments and projections against different Baryon limit points, incorporation of available minor semiaxial extensions, etc. However, this will not be illustrated here.

Figure 11:
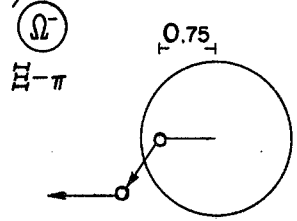
FIG. 11 shows as in FIG. 3 the Ω$^-$ Hyperon unfolding.
Figure 11:
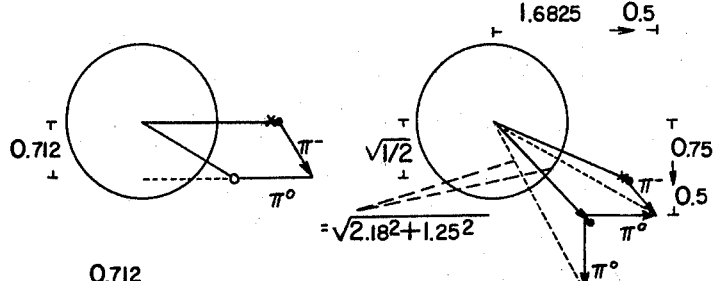
Figure 11:
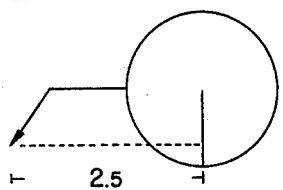
Figure 11:
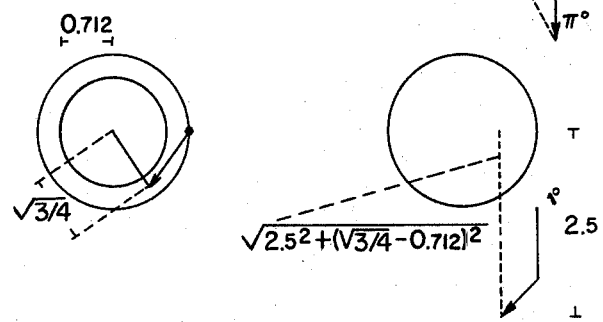

$\Omega^-$ is uniquely related to $\Xi(1318)$ in an equal way as $\Xi(1318)$ is related to $\Lambda^0$. Commutating $\pi^-$ and $\pi^0$ unfoldings from the ellipsoid foci of $\Xi^0$ and $\Xi^-$, respectively, are therefore likely (FIG. 11). If projecting against the $\Xi$South pole, the major semiaxis would be of length $\sim 2.51$ and fall tangent upon one of the $\Xi$minor semiaxes, whose length of $\sim 0.712$ might then be directly included in the unit ellipsoid. The length of the contracted minor semiaxis would then be $1/(0.712 \cdot 2.51) = 0.5596$, and the $\Omega^-$ mass $= 1/0.5596 \cdot 938.26 = 1676.5$ MeV. A $K^-$ unfolding from the $\Lambda^0$ apex would give a virtually identical result with mass expression $\sim 1672$ (FIG. 11b); just as in reality.

The $\Lambda$ Resonance series

Figure 12:
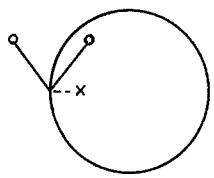
FIGS. 12–18 show projections similar to those in FIG. 3 of the Λ resonance series.
Figure 12:
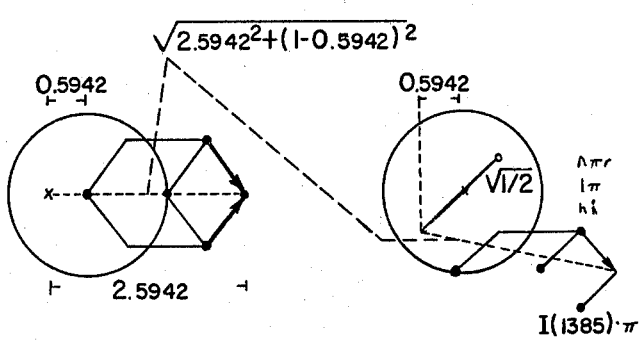

The first of the resonances in the $\Lambda$ series, $\Lambda'(1520)$, exhibits a variety of formation and decay possibilities both experimentally and in the diagrammatic reproduction (FIG. 12). The major semiaxis may project upon one of the $\Lambda^0$ minor semiaxis terminations in the $Q=0$ plane, with a length of $\sqrt{6.9}$ and mass $1/\sqrt[4]{1/6.9} \cdot 938.26 = 1520.47$. The presence of two-pion decays may be consistent with the $J^P$ number of $-3/2$. The tentative, three-pion representation of the $\overline{K}$ here may be of relevance for a later estimation of its mass.

Figure 13:
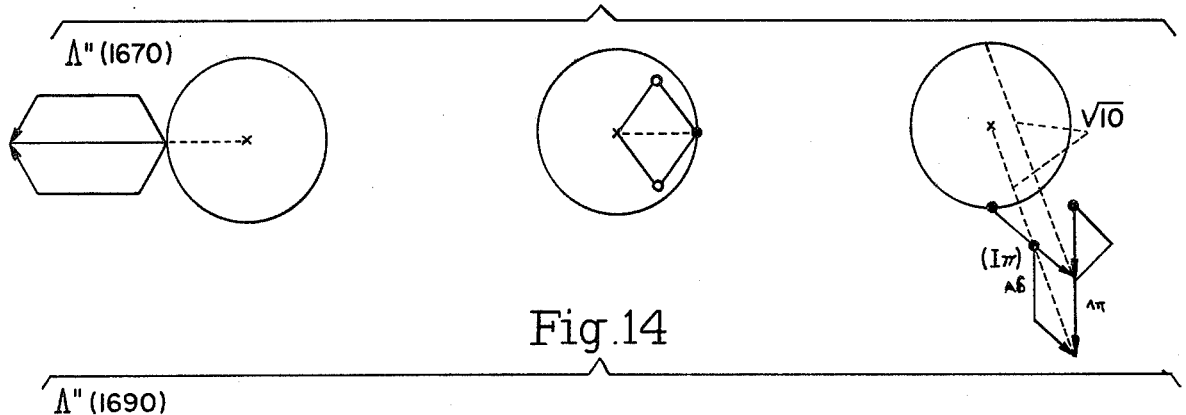

$\Lambda''(1670)$ is strongly suggestive of a $\sqrt{10}$ major semiaxis resonance, which can be reached by tentative $N-/OVs/K/$ or $\Lambda - \eta$ unfoldings in the lattice (FIG. 13). The $\Sigma - \pi$ channel is more elusive. A degeneracy with $\pi(1670)$ is one possibility, and will be discussed later. The mass of $\Lambda''(1670)$ can be calculated as $1/\sqrt[4]{1/10} \cdot 938.26 = 1668.5$, and the spin parity $(-\frac{1}{2})$ may be related to its one-meson decay modes. Like with $\overline{K}$, the pion sequence representation of $\eta$ here is of possible relevance for a later estimation of its mass.

Figure 14:
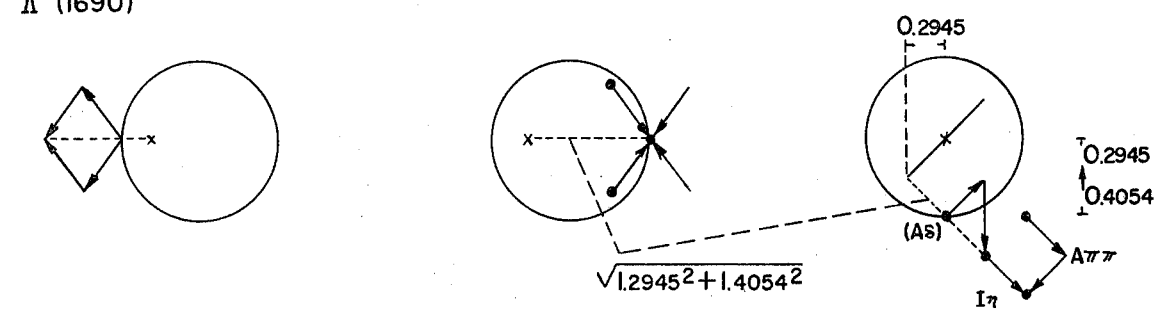

$\Lambda''(1690)$ (mass range 1680-1691) may be reached via $\Lambda^0 \pi\pi$, $(\Sigma\pi\pi)$ or $\Sigma\pi$, and also by $N-\overline{K}$, as outlined in FIG. 14. From this end-point, a major semiaxis of length $\sim 4.52 \approx 2.13$ would fall tangent and normal upon one of the $\Lambda^0$ minor semiaxes in the $Q=0$ plane. If the $\Lambda^0$ minor semiaxis may then be incorporated in the resulting unit ellipsoid, the other minor semiaxis of this would have length $1/(2.13 \cdot \sqrt[4]{\frac{1}{2}}) \approx 0.5583$, which would give a mass of $1/0.5583 \cdot 938.26 \approx 1680$ Mev. The decay modes, including double pions, are consistent with the $J^P$ number of $-3/2$.

Figure 15:
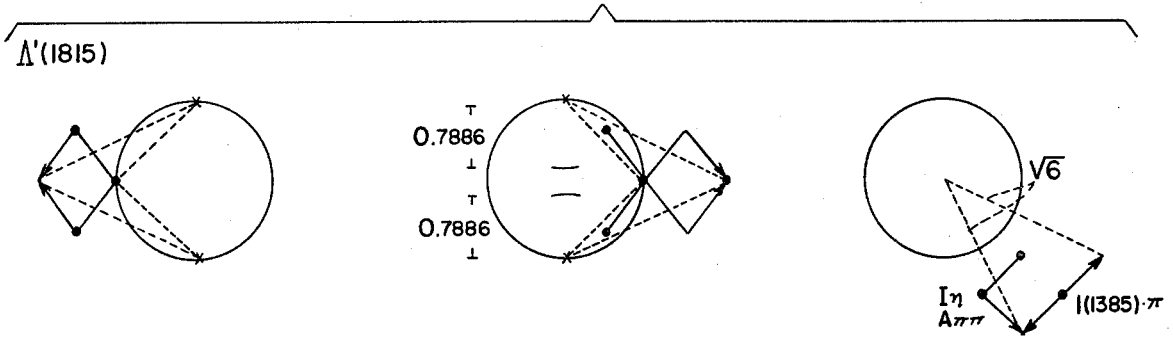

Like the other $\Lambda$ resonances, $\Lambda(1815)$ has been observed predominantly in the $K^- - p \rightarrow \Sigma^+ \pi^-$ and $K^- - p \rightarrow \Sigma^- \pi^+$ reactions. Its decay modes also include $\Sigma(1385)^+$, $^- - \pi^-$, $^+$ and possibly $\Lambda^0 - \pi^+$, $\pi^-$. This can be given a commutating diagrammatic representation (FIG. 15). The pion directions might suggest a positive spin orientation. If the major semiaxis projection is against the $\Sigma(1189)^{+,-}$ centre points in the nucleon north and south poles, it might incorporate also the $\Sigma(1189)$ height of $\sqrt{0.62188} = 0.7886$, realizing the unit volume as $\sqrt{6} \cdot 0.7886 \cdot b_2 = 1$; $b_2 = 0.5177$; mass $= 1/0.5177 \cdot 938.26 = 1812.4$.

Figure 16:
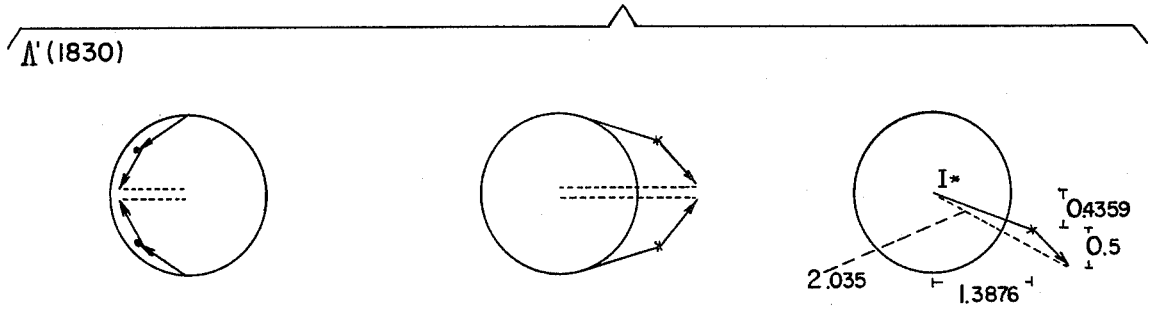
Figure 17A:
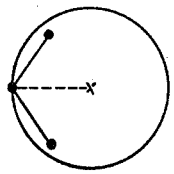
Figure 17A:
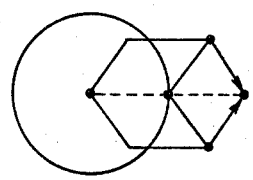
Figure 17A:
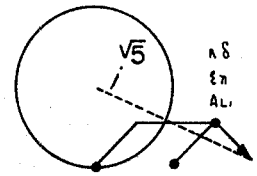
Figure 17B:
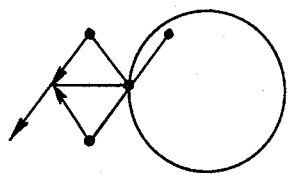
Figure 17B:
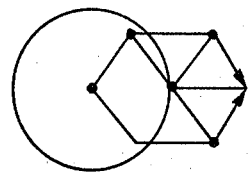
Figure 17B:
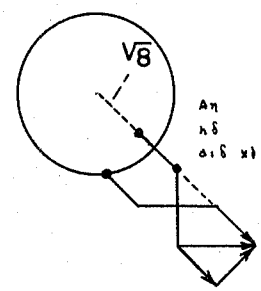

The evidence for a $\Lambda(1830)$ resonance is more uncertain. Apart from a $N-\overline{K}$ channel, $\Lambda'(1830)$ seems uniquely related to $\Sigma(1189)^{+,-} - \pi^{-,+}$. A $\pi^-$ or $\pi^+$ unfolding from the $\Sigma(1189)^{+,-}$ elliptic foci, not commutating with $\Sigma(1385)$ or $\Lambda^0$ is therefore possible (FIG. 16). There would be a horizontal projection of $\sqrt{(1.8076)^2 + (0.93587)^2} = 2.0355$ to the $\Sigma(1189)$ vertical axis, and the height to the $\Sigma(1189)$ centres in the nucleon north and south poles would be 0.96243. If this is taken over as one minor semiaxis, the unit volume expression is $2.0355 \cdot 0.96243 \cdot b_2 = 1$; $b_2 = 0.51046$; mass $= 1/0.51046 \cdot 938.26 = 1838$.

$\Lambda 2100$ can be reached in several different ways which may perhaps all lead to a $\sqrt{5}$ major semiaxis projection to the nucleon centre (FIG. 17). If the transformation also includes the distance of 1 from the centre to the nucleon north and south poles in the unit volume, this is realized as $\sqrt{5} \cdot 1 \cdot b_2 = 1$, and the mass equivalent is $\sqrt{5} \cdot 938.26 = 2098$. The $\Lambda\eta$ and $N-\overline{K}-\pi$ modes may alternatively induce a $\sqrt{8}$ projection to the nucleon centre. Retaining the $\Sigma(1189)$ height of 0.7886, there would result a unit volume of $\sqrt{8} \cdot 0.7886 \cdot b_2 = 1$; $b_2 = 0.4483$; mass number $= 1/0.4483 \cdot 938.26 = 2093$ (FIG. 17b).

Figure 18:
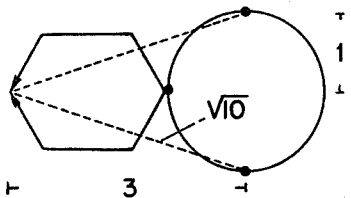
Figure 18:
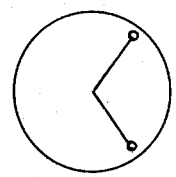
Figure 18:
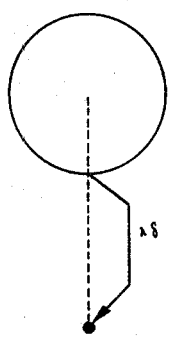

An incorporation of the $\Sigma(1189)$ height of 0.7886 in a $\sqrt{10}$ major semiaxial projection would correspond to the mass $0.7886 (\sqrt{10}) \cdot 938.26 = 2340$. The projection might be realized as the observed $\Lambda 2350$, $N-\overline{K}$ resonance (FIG. 18). Several higher mass number $\Lambda$ states with $N-\overline{K}$ channels may also be conjectured from the suggested combination of one projectionally defined major semiaxis with one available minor semiaxis of length 1 or the $\Sigma(1189)$ height of 0.7886; for instance, $\sqrt{11} \cdot 0.7886 \cdot b_2 \approx 245$, $\sqrt{7} \cdot 1 \cdot b_2 \approx 2482$, or $\sqrt{7.5} \cdot 1 \cdot b_2 \approx 2570$.

The $\Sigma$ resonances

Figure 19A:
FIGS. 19–22 show projections similar to those in FIG. 3 of the Σ resonance series.
Figure 19A:
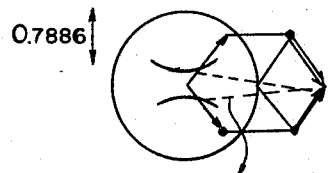
Figure 19A:
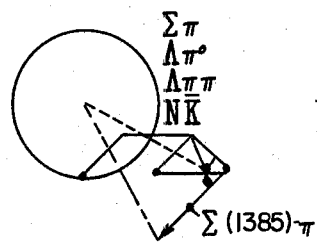
Figure 19B:
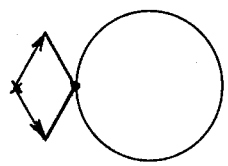
Figure 19B:
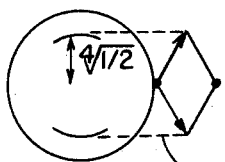
Figure 19B:
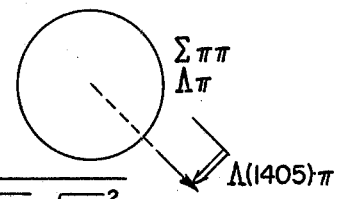

The $\Sigma$ resonances belong to the same, $Y^*$ series as the $\Lambda$ states, and therefore reasonably represent other linear combinations of equivalent semiaxes occuring under the common formation conditions. Single $\Lambda^0 - \pi^-$ and $\Lambda^0 - \pi^0$ transitions are also included in the $\Sigma$ states, so that the minor semiaxis of $\Lambda^0$ should belong to the distances which might be incorporated in the volumetric expression of $\Sigma$ resonances. It would be too lengthy to discuss all $\Sigma$ states here but a few examples in various parts of the mass spectrum will be briefly mentioned. $\Sigma'(1670)$ has been observed in both production and formation experiments. There are strong indications of a heterogeneity of $\Sigma'(1670)$, and the bewildering variety of decay modes suggest at least two types of semiaxial developments (the $N-\overline{K}$ mode is perhaps a third, $\sqrt{10}$ major semiaxis unfolding). The $\Sigma(1189)^{+,-} - \pi^{-,+}$ (which may be degenerate with $\Lambda''(1670)$), $\Lambda^0 - \pi^0$, $\Lambda^0 - \pi^+$, $\pi^-$ and $\Sigma(1385) - \pi^{+,-}$ (and possibly $N-\overline{K}$) channels can be traced to the $Q=0$ plane (FIG. 19a), while $\Sigma(1189) - \pi$, $\pi$; $\Lambda^0 - \pi^{+,-}$; $\Lambda(1405) - \pi$ (and possibly $\Sigma(1189)^0 - \pi^{+,-}$) would have their common apical point in the Q=+−1 planes (FIG. 19b). In the first case, the distance to the nucleon centre is $\sqrt{5}$ and to the under and upper margin of $\Sigma(1189)^+$ and $\Sigma(1189)^-$, respectively, $=\sqrt{5}+(1-0.7886)^2$, so that a unit volume including the $\Sigma(1189)$ height as one minor semiaxis might be realized as $\sqrt{5}\cdot 0.7886\cdot b_2$ with a mass of $1.7634\cdot 938.26=1654.5$ or, perhaps more likely, as $\sqrt{5}+(1-0.7886)^2\cdot 0.7886\cdot b_2$ with a mass equivalent of 1661.9. In the second case, a projection of length $\sqrt{(1.5)^2+(1.5)^2+(\sqrt[4]{\frac{1}{2}}-\sqrt{\frac{1}{2}})^2}=2.1255$ to the north and south poles of $\Lambda^0$ and an incorporation of one $\Lambda^0$ minor semiaxis might be conjectured, spanning a unit volume of $2.1255\cdot\sqrt[4]{\frac{1}{2}}\cdot b_2$ with mass $1.7874\cdot 938.26=1677$.

Figure 20:
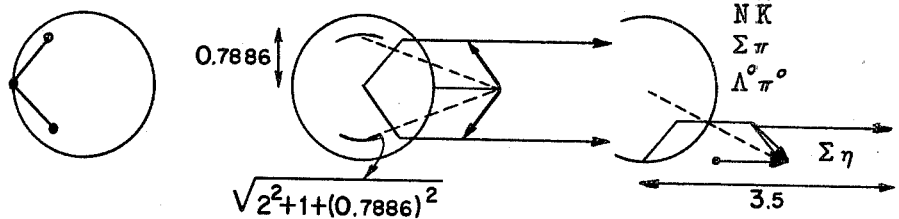
Figure 21A:
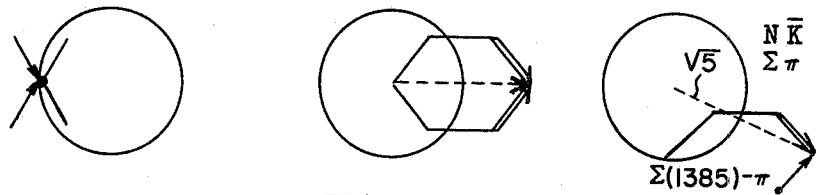
Figure 21B:
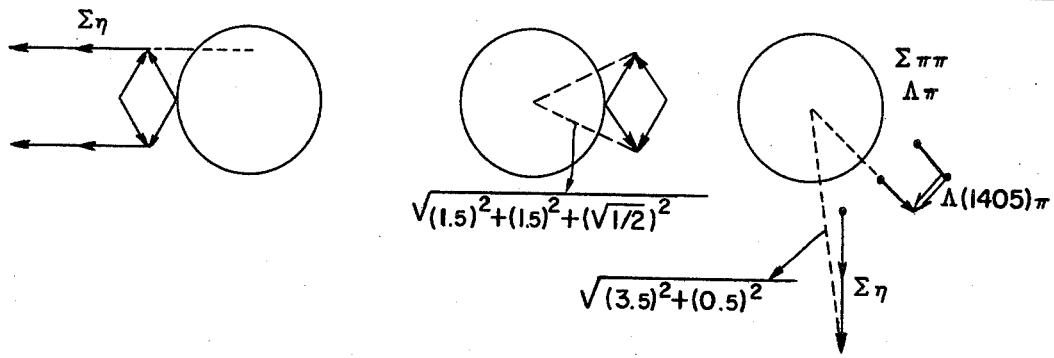
Figure 22:
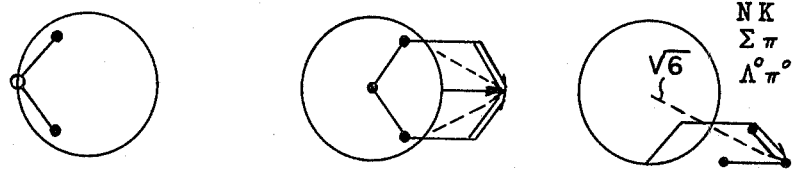

$\Sigma''(1750)$ might represent a $\sqrt{5+(0.7886)^2}=2.3711\cdot 0.7886\cdot b_2$ (FIG. 20), or (in the $\Sigma\eta$ channel) $3.5\cdot\sqrt{1/3.5}\cdot\sqrt{1/3.5}$ unit ellipsoid with mass $1.8698\cdot 938.26=1754.4$ and $1/\sqrt{1/3.5}\cdot 938.26=1.8708\cdot 938.26=1755.3$, respectively. The multitude of decays of $\Sigma(1765)$ may emanate from limit points in the Q=0 or Q=+−1 planes (FIGS. 21a−b). A projection against the $\Lambda^0$ centre would from both give a $\sqrt{5}$ major semiaxis, which, taking over one $\Lambda^0$ minor semiaxis, outlines the unit volume $\sqrt{5}\cdot\sqrt[4]{\frac{1}{2}}\cdot b_2$ and the mass $1.8803\cdot 938.26=1764.2$. The $\Sigma\eta$ channel may establish a $\sqrt{12.5}$ major semiaxis against the $\Lambda^0$ vertical axis (FIG. 21b) with a consequential mass of $1/\sqrt[4]{1/12.5}=1.8803\cdot 938.26=1764.2$, too. There are several possible, probable or definite $\Sigma$ resonances between 1880–2030 MeV (7–10). All exhibit $\Lambda^0-\pi^+,^-$ or $\Lambda^0-\pi^0$ partial decay modes. Their not very sharply defined masses can be approximately reproduced as various combinations of one incorporated minor semiaxis of length $\sqrt[4]{\frac{1}{2}}$ or 1, and a major semiaxis extension between $\sqrt{4.5+(1-\sqrt{\frac{1}{2}})^2}$ and $\sqrt{6}$. The highest mass number $\Sigma$ resonance with a single $\Lambda^0-\pi$ decay mode is $\Sigma(2250)$ (2165–2330 MeV). It can be represented as a $\Lambda^0-\pi^0$, $\Sigma(1189)-\pi$ or $N-\overline{K}$ unfolding, projecting with a $\sqrt{6}$ major semiaxis against the nucleon north and south poles (FIG. 22) and including 1 as one minor semiaxis; $\sqrt{6}\cdot 1\cdot b_2=1$; mass$=\sqrt{6}\cdot 938.26=2298$. $\Sigma(2455)$ and $\Sigma(2620)$ only have $N-\overline{K}$ decays. The masses are rather widely spread so there is a variety of possible semiaxial combinations yielding roughly corresponding mass numbers ($\sqrt{9.707}\cdot\sqrt[4]{\frac{1}{2}}\cdot b_2\approx 2458$; $\sqrt{10}\cdot\sqrt[4]{\frac{1}{2}}\cdot b_2\approx 2494$; $\sqrt{11}\cdot\sqrt[4]{\frac{1}{2}}\cdot b_2\approx 2617$; and $\sqrt{8}\cdot 1\cdot b_2\approx 2653$). The potential mass range of the $\Sigma$, $N-\overline{K}$ channels would not be exhausted until about $\sqrt{10}\cdot 1\cdot 938.26=2967$.

N'(1470), the N and Delta resonances

Figure 23:
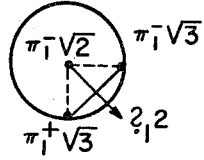

N'(1470) introduces a new class of resonances, the N and $\Delta$ series, which present a very confusing and elusive pattern. Since they were originally analysed in $p-\pi^+$ and $p-\pi^-$ scatterings and $p-\gamma$ (and $n-\gamma$) photoproduction processes, it is tempting to represent them in the simplistic volumetric model here as unit deformations of the proton, commutating with the neutron predominantly by two-pion unfoldings. However, this must be a purely tentative and approximate replication since the more detailed numerical characteristics of the N and $\Delta$ resonances are insufficiently known. Firstly, the electromagnetical charge relations are not clarified. As judged from the decay constituent charges, ++, + and 0 states may tower up in reciprocity with the production impacts on the proton, but they may occur as alternative charge states in some resonances and single charge states in others. Secondly, the N and $\Delta$ mass numbers are increasingly approximate mean values, probably reflecting fluctuating scattering profiles due to obliquely orientated projectional axes, and severely hampering the attempts at a more precise mass reconstruction. Finally, their angular distribution is difficult to understand. There is no consistent association of positive or negative spin-parity with the mass or decay pattern. It might instead be speculated that some scatterings "pass through" in the resonance intertwining with unchanged angular direction while others recoil with reversed angular orientation. In consequence, the corresponding resonance configurations might be something like paraboloid sheets or outfolding resonator cavities rather than straightforward ellipsoids. However, the computations would be isomorphic, and ellipsoidal configurations, in particular the $\Delta(1236)++$ and $\Delta(1236)^0$ states, are undoubtly important intermediate extensions of the N and $\Delta$ scatterings. The simple scheme of tracking down unit unfoldings in an O(3) vector diagram will therefore be continued here. Single pion developments from the proton (or $n-2\pi$) against vertical, $H_2$ planes of the nucleon's root space diagram might establish projectional axes of $\sqrt{2}$, $\sqrt{3}$ and $\sqrt{4}$ to the nucleon centre (FIG. 23). These unfoldings in various permutations may form the extensions of the N and $\Delta$ resonances, many of which will here be regarded as convoluted ellipsoids, Weyl reflected in a common peripheral limit point of the total baryon configuration. Alone, the $\sqrt{2}$ axis might provide a vertical $\Lambda^0$ state, the $\sqrt{3}$ axes a $\Delta^0$ and a $\Delta^{++}$ state, and, interestingly, the $\sqrt{4}$ axis ($1/\sqrt[4]{\frac{1}{4}}\cdot 938.26=1326.9$) a potential, $\Lambda^0-\gamma$ or $p-\pi$, $\Lambda(1330)$ state.

Figure 24:
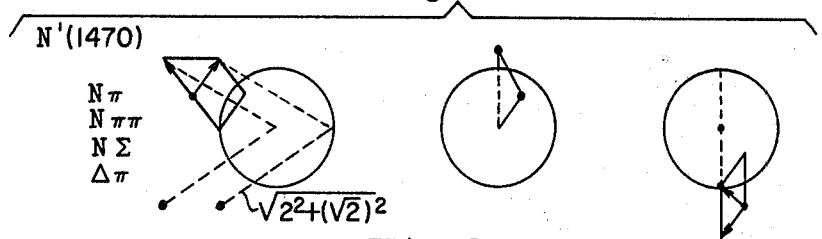
Figure 25A:
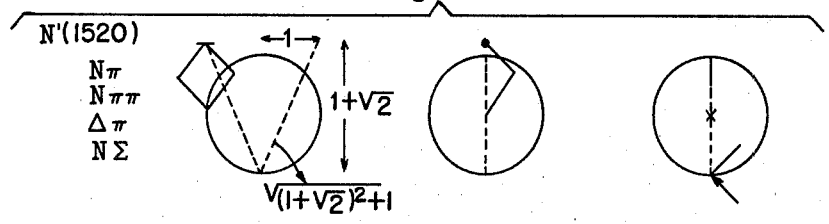
Figure 25B:
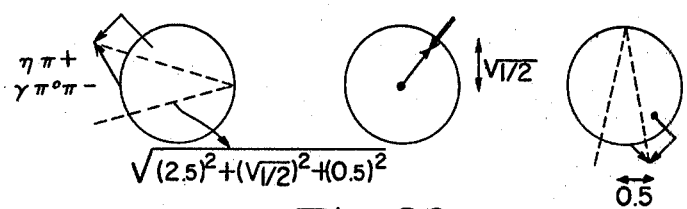

Very briefly and incompletely suggesting possible conformations of the N and $\Delta$ resonances, N'(1470) may have a major semiaxis of $\sqrt{(\sqrt{2})^2+2^2}=\sqrt{6}$ (FIG. 24), with a mass number of $1/\sqrt[4]{1/6}\cdot 938.26=1468.5$. N'(1520) probably represents a $\sqrt{(1+\sqrt{2})^2+1}=\sqrt{6.8284}=2.6131$ major semiaxis state, with a mass of $1/\sqrt{\frac{1}{2}}\cdot 6131\cdot 938.26=1.6165\cdot 938.26==1516.7$ (FIG. 25a), or ($n-\pi+$ and $p-\pi^+$, $\pi^-$ channels) $\sqrt{7}$ state with mass $\approx 1526$ (FIG. 25b).

Figure 26:
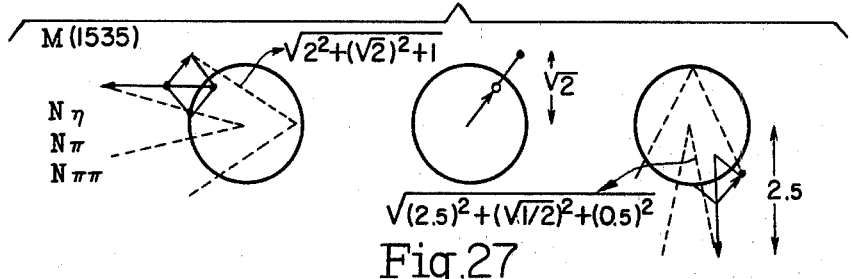

N'(1535) (1500–1600 MeV) has a nucleon-eta partial decay mode, which may similarly implicate a $\sqrt{7}$ major semiaxis that can be accomplished also by nucleon (N)$-\pi$ and $N-\pi,\pi$ transitions (FIG. 26). The resulting mass is in the order of $1/\sqrt[4]{1/7}\cdot 938.26=1526.2$.

The many N and $\Delta$ resonances in the mass range $\sim 1620$–1980 MeV represent something of a combinatorial embarasse du richesse. Their often widely spread and overlapping masses and their similar decay modes give few clues as to which precise semiaxes might be involved in the separate resonance distributions, some of which may also exhibit internal degeneracies. The suggestions here are therefore extremely arbitrary and mostly to indicate the possibilities that the vector system contains to provide sufficient extensions for the N and $\Delta$ states.

Figure 27:
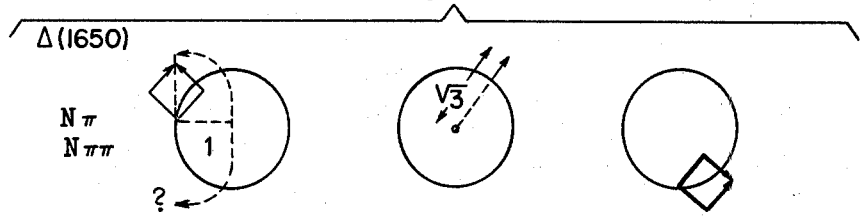

A combination of the semiaxes $\sqrt{3}$ and 1 might, for instance, establish bases for the $\Delta(1650)$ (1615–1695 MeV) resonance (FIG. 27) but other realizations might be conjectured as well.

Figure 28A:
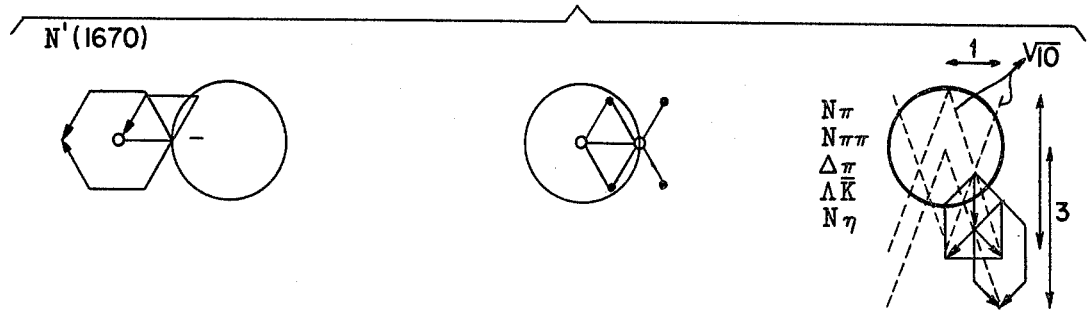
Figure 28B:
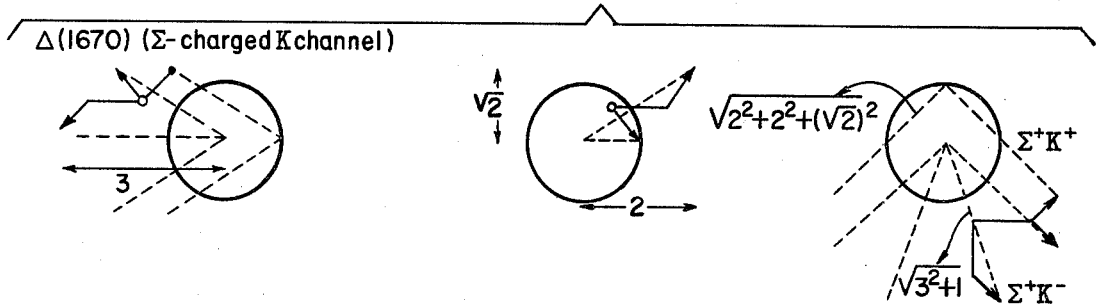
Figure 29A:
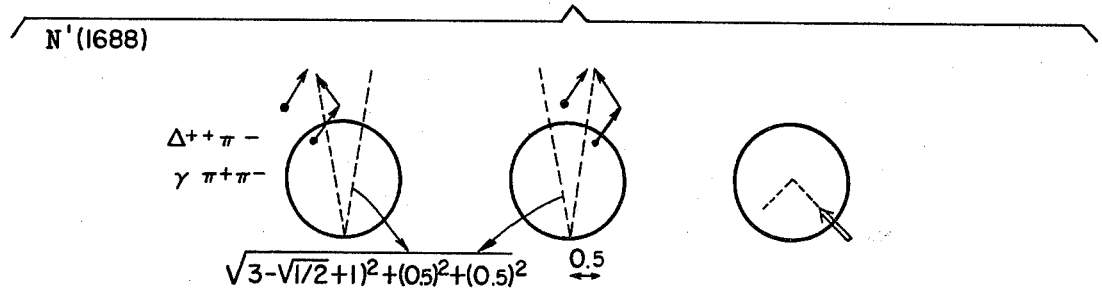
Figure 29B:
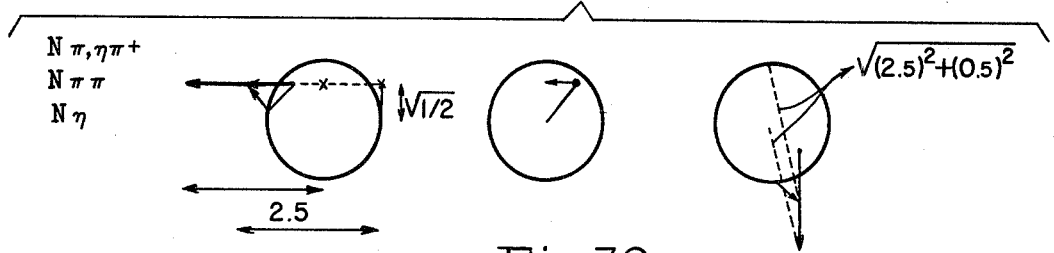

N'(1670) and $\Delta(1670)$ with their $N-\eta$ and $\Lambda^0-\overline{K}$, and $\Sigma$−charged Kaon partial decay modes, suggest $\sim\sqrt{10}$ major semiaxis projections (FIG. 28), while N'(1688) with its bewildering multitude of reported partial decays is more elusive. Along the $p-\pi^+$, $\pi^-$ and $\Delta^{++}-\pi^-$ channels it is tempting to visualize a $\sqrt{10.25}$ major semiaxis towards the nucleon south pole with a mass number of $1/\sqrt[4]{1/10.25}\cdot 938.26=1678.5$;

while other channels may imply a major semiaxis of $\sqrt{(2.5)^2+(0.5)^2}=\sqrt{6.5}=2.5495$, and one minor semiaxis of $\sqrt{\frac{1}{2}}$, which would correspond to a mass of 1691.5 (FIG. 29).

Figure 30:
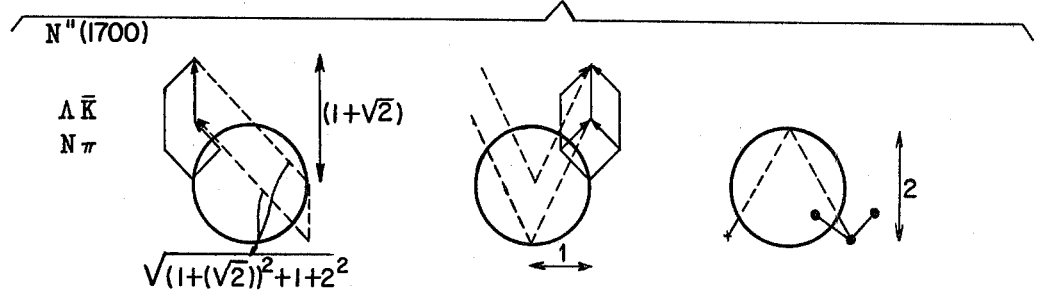

In N''(1700) it is possible to trace a major semiaxis of $\sqrt{(1+\sqrt{2})^2+2^2+1}=\sqrt{10.8284}$, enclosing the nucleon and yielding a mass of $\approx 1702$. (FIG. 30). In such peripheral projections, mostly with negative spin-parity, it is again tempting to imagine the linear dimensions of wall of outfolding resonator cavities.

Figure 31:
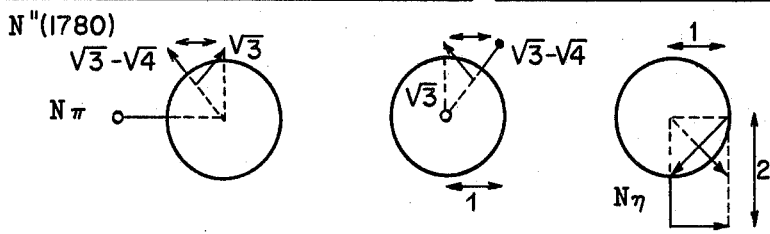
Figure 32A:
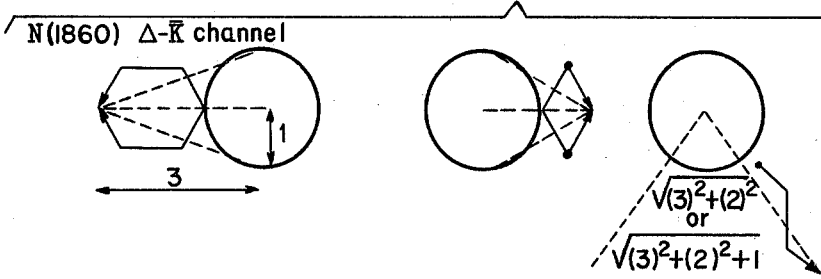
Figure 32B:
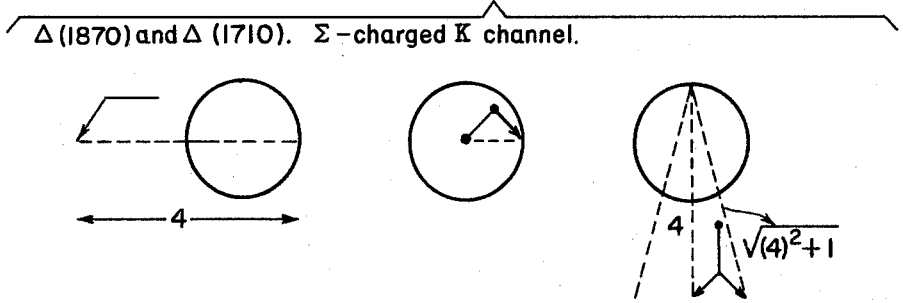

N''(1780) has $J^P+\frac{1}{2}$, however, and a very wide mass distribution (1650–1860 MeV). Could this simply reflect a major semiaxis oscillating between the possible extensions $\sqrt{3}-\sqrt{4}$, corresponding to a mass fluctuating between $\sqrt{3}\cdot 1\cdot 938.26=1626$, and $2\cdot 1\cdot 938.26=1876$ (FIG. 31)? In the ensuing, very resemblant resonances N(1860), $\Delta$(1890) and $\Delta$(1910), the N$-\pi$ and N$-\pi,\pi$ channels may also be compatible with a realization along different aspects of the nucleon of $2\cdot 1\cdot b_2$ or $\sqrt{2}\cdot\sqrt{2}\cdot b_2$ or equivalent volume expressions, whose mass counterpart of $\sim 1876$ is within the mass range of all these states. However, the interesting partial decay modes of $\Lambda^0-\overline{K}$ in N(1860) and $\Sigma-$charged K in $\Delta$(1890) and $\Delta$(1910) (7), may indicate the presence of degenerate alternatives described by major semiaxes of $\sqrt{13}$ (mass $\sim 1781$) or $\sqrt{14}$ (mass $\sim 1814$) in N(1860); 4 (mass $\sim 1878$) in $\Delta$(1890) and $\sqrt{17}$ (mass $\sim 1905$) in $\Delta$(1910) (FIG. 32).

Figure 33A:
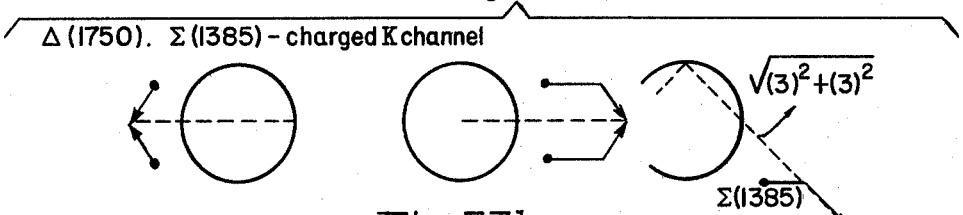
Figure 33B:
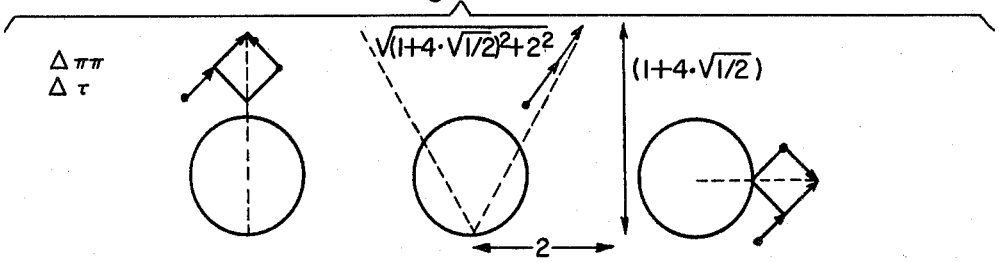
Figure 33C:
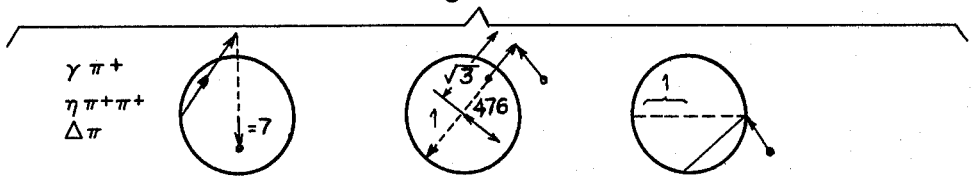

In the more well-established, $\Delta$(1950) resonance, even longer major semiaxes could be imagined; in the observed $\Sigma$(1385)$-$charged K (and possibly $\Sigma$(1189)$-$charged K) channel a $\sqrt{18}$ projection with mass around $1/\sqrt[4]{1/18}\cdot 938.26=1932$, and in the $\Delta-$double pion and $\Delta-$rho(765) modes a $\sqrt{18.66}$ extension with mass equivalent $\sim 1950$ (FIG. 33 $a$–$b$). The other, p$-\pi^+$, n$-\pi^+,\pi^+$ and $\Delta-\pi$ modes might be superposed on the $\Delta$ configuration and incorporate one of its minor semiaxes, realizing the unit volume as $(\sqrt{3}+1)\cdot 0.76\cdot b_2$ corresponding to a mass of $(\sqrt{3}+1)\cdot 0.76\cdot 938.26=1948$ (FIG. 33$c$).

Also the remaining higher mass number N and $\Delta$ states may plausibly include as one minor semiaxial extension one of the projectional distances available or provided by the unfolding; outlining for instance N(2190) as $\sqrt{9}\cdot 0.76\cdot b_2$ (mass $\sim 2136$); N(2220) as $\sqrt{6}\cdot 1\cdot b_2$(mass $\sim 2298$); $\Delta$(2420), $\sqrt{7}\cdot 1\cdot b_2$ (mass $\sim 2482$); N(2650) (FIG. 34), $2\cdot\sqrt{2}\cdot b_2$ (mass $\sim 2653$); $\Delta$(2850), $\sqrt{3}\cdot\sqrt{3}\cdot b_2$ or $\sqrt{9}\cdot 1\cdot b_2$ (mass $\sim 2814$); N(3030), $\sqrt{5}\cdot 2\cdot b_2$ or $\sqrt{10}\cdot 1\cdot b_2$ (mass 2967); and $\Delta$(3230) (FIG. 35), $2\cdot\sqrt{3}\cdot b_2$ (mass $\sim 3250$).

CONCLUDING REMARKS

With the N and $\Delta$ resonances, the list of more consistently documented Baryons is complete. It may be concluded, that systematic major semiaxis unfoldings in the O(3) lattice diagram yield combinations which match the observed states, channels and masses in a transformation spectrum equally multi-faceted, periodically overlapping and in a sense even varying in probability as the naturally occuring Hyperons themselves; and which also avoid to produce states, channels and masses which have not been confirmed as separate degeneracies. Furthermore, not only the Baryons but also the extensions along the t-isospin axis of the basis meson states $\Lambda^\pm$, $\Lambda^0$, $\eta$, $K^\pm$, $\overline{K}$, $\rho$ and $\omega$ have been outlined in the diagram as various sequences of unit root vector lengths. Utilizing their differential extensions in an O(1-)$\times$O(2) symmetry scheme, it is actually possible to obtain a very accurate derivation of the masses of all these mesons as well within the framework of the sterigraphical Lie Algebra realization system. However, the specific subject of the present disclosure is constituted by the Baryons. The concrete construction and means of manufacturing; (i) a structural, volume-invariantly deformable spheroidal Bag model, (ii) a volume-preserving geometrical transformation gauge, ruler or mould, and (iii) tangible model elements of defined Bag ellipsoids as derived from the oulined Lie Algebra lattice representation, will therefore be confined to the separate and distinct Baryon class of elementary particles. When producing a real-life construction set and physical models of defined Baryon Bags it should be an advantage that their proposed infinitesimal symmetry group is the same as the common geometrical symmetry perceived in the global realization space of the ordinary world. This symmetry equivalence would in fact not only have implications for the physical interpretation of the Baryons and other elementary particles which can be traced in the sterigraphical lattice representation, but may also open a possibility of deriving their life times from an analysis of their global integrability conditions. This of course would provide another strong support of the relevance of the system but is not required when producing concrete models of defined Baryons derived from it, which is the purpose and subject matter of the following disclosure. Nonetheless, it can be vindicated that the method of associating the Baryon mass expressions with their minimal length extensions along a minor semiaxis contracting in the transformation is in line also with present quantum chromodynamical theories and formulations, where the major contributions to the Baryon masses are provided by their fine and hyperfine mass splittings. These are thought to be proportional to the quark-quark and quark-vector gluon coupling strenghs, or expectation values, which are scale-dependent and over the finite spatial extensions of colour iso-singlet Baryons successively larger with smaller interquark-vector gluon separation distances.

PHYSICAL MODEL

The previous section has outlined the theoretical background, principles and formulation of a sterigraphical Lie algebra representation system, producing defined ellipsoids (or homomorphic spheriodal bodies) which provide direct geometrical images and physical shapes of volume-invariant Quark Bags for all experimentally observed Baryon states.

In the following, an actual material gauge set and tangible construction components consisting of and manufacturing models of these Baryon Bag ellipsoids and their defined volume-perserving transformations and mass numbers as derived from the sterigraphical representation system will be described specifically in regard to the most basic Baryons; viz. the ground state Nucleon and the $\Lambda$, $\Sigma$, $\Delta$, $\Xi$, $\Sigma$(1385), $\Lambda$(1405), $\Xi$(1530) and $\Omega^-$ Hyperons. Said structural gauge set and model elements, which form the subject and contents of the present disclosure comprise:

(i) A deformable physical spherical Baryon Bag model possessing a constant volume and thereby capable of and demonstrating volume-preserving transformations.

(ii) A geometrical Baryon Bag transformation gauge, ruler or mould; performing and exhibiting on this Baryon Bag model or other deformable quantities of matter those volume-invariant and symmetry-preserving, ellipsoidal transformations of the ground state spherical Baryon Bag volume, which by their defined proportions constitute and show the contrived physical models of the $\Lambda$, $\Sigma$, $\Delta$, $\Xi$, $\Sigma(1385)$, $\Lambda(1405)$, $\Xi(1530)$ and $\Psi^-$ Baryon Bags and their mass numbers.

(iii) These produced ellipsoids, uniquely defined by their characterized proportions, as the manufactured physical forms, embodiments, shells or encasements comprising the tangible individual models of said $\Lambda$, $\Sigma$, $\Delta$, $\Xi$, $\Sigma(1385)$, $\Lambda(1405)$, $\Xi(1530)$ and $\Omega^-$ Baryon Bags and their mass numbers.

(i) DEFORMABLE, VOLUME-INVARIANT BARYON BAG MODEL

Baryon Bags have been described as "bubbles", containing the topological representation space of their Gluons and Quarks, sometimes referred to as Quark "vapor" or "soup". With reference to FIG. 36, the straight-forward material construction of the composition and geometrical configuration of such a Baryon bubble Bag model consists of a balloon-like, spherical vesicle 10 filled with a given volume of fluid 11 (or gas, gel, foam or other deformable matter). The wall of the vesicle can be manufactured of rubber, plastic or other soft material, which can be transparent or coloured, unprinted or printed with digits, letters or other symbols. In the present contrivance, the Bag is filled with clear transparent water, but it can also be coloured, semi- or non-transparent fluid, white or other colour emulsion, mercury or any other constant volume of liquid or otherwise deformable matter. One practice method of manufacturing such a fluid-filled spherical vesicle model of ground state Baryon Bags is to spray transparent plastic solution, fusing to a coat on a preformed, clear or coloured sphere of ice or other frozen liquid of desired volume. Upon defrosting, a seamless, soft and pliable Bag of spherical ground shape and filled with the volume of reliquified fluid results. It is also possible to manufacture the same Bag model by other methods, for instance, filling or injection of fluid in preformed soft spherical vesicles or balloons. Regardless of the method of producing the described Bag model, it is then possible to subject the pliable Bag to an infinity of deformations; stretchings, twisting, bendings etc., but since the Bag is filled with the volume of under ordinary conditions incompressible fluid these deformations will preserve volume and thus directly possess and demonstrate this fundamental type of geometrical gauge invariance under shape transformation. This is the basic gist of the invention while the chosen volume of the vesicle and its contents is arbitrary; it can be a deciliter, a volume corresponding to a sphere of unit (e.g. a centimeter or an inch) radius or diameter; it can even be a liter or a pint or a gallon and used for the appending function of displaying and distributing liquid contents like chemicals, beverages or indeed "soups" etc. The soft, fluid-filled spherical Bag can be separate or mounted, attached or embedded in or against a frame or other background or surroundings with or without scales or decorations or other arrangements. Here it is specifically constructed and described in its own basic property of a soft ground state spherical Baryon Bag model possible to subject to and thereby performing and demonstrating an infinity of volume-invariant transformations. Its size is here exemplified as a sphere of unit (1 cm or 1 inch) radius (corresponding to a model scale of about $10^{13}$: 1).

(ii) A VOLUME-PRESERVING GEROMETRICAL TRANSFORMATION GAUGE (RULER OR MOULD) OF THE NUCLEON, $\Lambda$, $\Sigma$, $\Delta\Xi$, $\Sigma(1385)$, $\Lambda(1405)$, $\Xi(1530)$ AND $\Omega^-$ BARYON BAGS.

A transparent plastic transformation gauge (ruler or mould) shown in FIG. 37a and 37b, which out of the infinitely many possible deformations of the spherical ground state Baryon Bag produces and demonstrates precisely those defined ellipsoids which have been derived from the sterigraphical Lie algebra representation system to realize and by their defined proportions comprise the physical models of the Nucleon, $\Lambda$, $\Sigma$, $\Delta$, $\Xi$, $\Sigma(1385)$, $\Lambda(1405)$, $\Xi(1530)$ and $\Omega^-$ Baryon Bags and their mass numbers in relation to the ground state spherical Nucleon Bag.

In the present disclosure, the geometrical gauge (ruler or mould) is made of two equal halves 12a and 12b, each formed out of a transparent, coloured or colourless, rigid plastic material. One or both of the halves can also be supplied with inlaid or printed length scales 13 and mass number calculations 14 and readings 15 of the displayed Baryon Bags. The halves can be freely pressed against each other, or removably or stationary attached to each other along one margin 16 by means of hinges, pivots or thin plastic band or similar mechanism. The other margins 17 can be fastened in closed position by a lock or magnet device.

In the present exemplification, the geometrical transformation gauge is described in reference to a ground state spherical Bag of unit radius which can be chosen as 1 cm or 1 inch, scale 13.

On the uppermost part on each of the guage halves, half of this spherical volume is formed as a half-spherical impression 18, so that when the halves are pressed against each other they together form the space of the unit radius ground sphere, which will then completely occupy and fill out the spherical space provided by the gauge. Alternatively, water or plaster or other deformable matter can occupy the space, and the shape can subsequently be made permanent by freezing or hardening or equivalent process. However, in the presently specified example, the contrivance is performed by means of the soft deformable spherical Bag 10, FIG. 36, filled with fluid 11 and of a radius 19 which is here chosen as unit (1 cm or 1 inch). In longitudnal sequence along the rest of each gauge half are impressions 20 corresponding half-ellipsoids of the same volume as the (half-)sphere.

Their major and minor semiaxes 21 and 22, respectively, which yield this equal volume, have been explicity derived as to their relative lengths from the sterigraphical Lie algebra representation system to comprise the specific proportions of the $\Lambda$, $\Sigma$, $\Delta$, $\Xi$, $\Sigma(1385)$, $\Lambda(1405)$, $\Xi(1530)$ and $\Omega^-$ Baryon Bags (Table 1), and also their mass numbers as expressed by the corresponding minor semiaxes. The specified semiaxial lengths express the mass numbers with a high precision; within the order of per mille; this high precision can not be anticipated in the physical execution of the gauge device. However, with the chosen length scales, a precision within the order of ½1 percent can be achieved in the actually manufactured proportions of the gauge. On one or both of the gauge halves, the exact lengths of both the major and minor semiaxes can be printed or otherwise indicated along them.

The ground state spherical Baryon Bag vesicle can be moved between the impressions of either of the halves of the gauge, and when the halves are closed, the Bag transforms to fill out the volume-invariant ellipsoid spaces of the defined Bag states. The same applies to any deformable quantity of matter, which, as can a corresponding number of separate Baryon Bag models, also fill out all or any number of the hollow spaces simultaneously, providing a Bag and Bag transformation set. In the present execution of the gauge, the plastic material is contrived as a rectangular rigid plate out of which the half-sphere and half-ellipsoid impressions are formed in a central column field by warm-forming against a corresponding press-form. This manufacture provides strength and precision within the above specified order. The impressions can also be made in thin sheets of plastics or other material by vacuum-forming or similar method and utilized either in both or only one of the halves or other parts of the gauge to contain and display prefabricated matter of corresponding shape like, for instance, gems educative objects, candy etc. The impressions can be arranged in other patterns than longitudinal, for instance, in two or more rows or irregularly along and around the sides of eachother etc. FIG. 38 shows an alternative arrangement. The basic gist of the gauge, ruler or mould as described and constructed here is to produce and demonstrate the defined volume-invariant ellipsoid transformation shapes and proportions of the most basic defined Baryon Bag states and their mass numbers, while the possible utilizations and means of manufacturing and executions of the gauge, ruler or mould are manifold.

(iii) PHYSICAL MODELS OF THE $\Lambda$, $\Sigma$, $\Delta$, $\Xi$, $\Sigma(1385)$, $\Lambda(1405)$, $\Xi(1530)$ and $\Omega^-$ BARYON BAGS These models consist of the set of ellipsoids, charachterized by their geometrical proportions, which comprise and exhibit the specific physical shapes and embodiements of the $\Lambda$, $\epsilon$, $\Delta$, $\Xi$, $\Sigma(1385)$, $\Lambda(1405)$, $\Xi(1530)$ and $\Omega^-$ Baryons and their mass numbers. They are shown in FIGS. 39 to 46.

Said separate and distinct Baryon Bag ellipsoids are uniquely and explicitly defined by their semiaxial extensions out of an infinity of possible ellipsoid configurations so that each of them constitutes and manufactures an individual model of an individual Baryon Bag and its mass number expression. The specified ellipsoid proportions and form of each separate Baryon Bag model can be reversibly or permanently produced by the special gauge contrivance of item (ii) of the present disclosure or corresponding devices, but they can also be manufactured by independent and special methods such as casting, sculpturing, carving, turning etc.

They can be made as hollow shells or encasements or as solid bodies; they can be transparent or non-transparent; clear or opaque; colourless or white or otherwise coloured; decorated or undecorated; empty or filled with decorative or educative contents, scales or root vector representations. They can be truncated obliquely, latitudinally or longitudinally so as to provide free-standing (or -lying) sculptural or educative or advertisment pieces. They can also be provided with matching foot plates or other support or framework with or without decorations, scales, designations etc.

They can be made out of ordinary or precious stones, of glass, plastic, wood or other minerals or materials. They can be fitted isolated or in sequences in objects like necklaces or other decorative items. They can also be hollow in the form of two equal halves or supplied with a lid so as to provide packages, parcels, encasements, envelopes, boxes or Bags in a literal sense, e.g. for candies or liquids, perfumes etc. They can be displayed and mounted as an assembly of transparent or white or otherwise coloured marbles, or an educational model set or as chess pieces; they can be made as bouncing balls, balloons and in many other usages, materials, sizes and ways of manufacturing. However, the subject matter and content of the models, characterizing all these and other executions, are the unique proportions and forms of the ellipsoids as defined geometrical objects and shapes, comprising direct physical models of the $\Lambda$, $\Sigma$, $\Delta$, $\Xi$, $\Sigma(1385)$, $\Lambda(1405)$, $\Xi(1530)$ and $\Omega^-$ Baryon Bags and their mass numbers.

In the present disclosure, said ellipsoids are manufactured by permanent casting in clear, colourless and transparent glass or plastic material in a solid mould or corresponding device as item (ii) of the present disclosure. The length scale of the radius of the ground state, Nucleon spherical Bag is here expressed as unit (1 cm or 1 inch).

Therefore, the specified characterizing proportions of the $\Lambda$, $\Sigma$, $\Delta$, $\Xi$, $\Sigma(1385)$, $\Lambda(1405)$, $\Xi(1530)$ and $\Omega^-$ Baryon Bag and models as expressed in the same length scale (cm or inches) are:

TABLE 1

| Baryon Bag | major semiaxis a | minor semiaxes b | minor semiaxes c | mass reading (938.26/c) | FIG. |
|---|---|---|---|---|---|
| $\Lambda$ | $\sqrt{2}$ | $\sqrt[4]{\frac{1}{2}}$ | $\sqrt[4]{\frac{1}{2}}$ | 1115.8 | 39 |
| $\Sigma$ | 1.60804 | 0.7886 | 0.7886 | 1189.8 | 40 |
| $\Delta$ | $\sqrt{3}$ | $\sqrt[4]{\frac{1}{3}}$ | $\sqrt[4]{\frac{1}{3}}$ | 1234.8 | 41 |
| $\Xi$ | 1.975 | 0.7116 | 0.7116 | 1318.5 | 42 |
| $\Sigma(1385)$ | $\sqrt{4.71}-\sqrt{4.75}$ | 0.678–0.679 | 0.678–0.679 | 1385–1382.2 | 43 |
| $\Lambda(1405)$ | $\sqrt{5}$ | $\sqrt[4]{1/5}$ | $\sqrt[4]{1/5}$ | 1403 | 44 |
| $\Xi(1530)$ | $\sqrt{7.06}$ | 0.6135 | 0.6135 | 1529.4 | 45 |
| $\Omega$ | 2.505–2.51 | 0.7116 | 0.560–0.561 | 1677–1673.5 | 46 |

The above specified semiaxes exhaustively and sufficiently define the unique ellipsoid proportions, shapes and forms of said Baryon embodiements with the same precision as their observed mass range.

In these structural models the masses are expressed and shown by the minor semiaxis (minor semiaxis c in $\Omega^-$), which provides a direct scale and reading of the inertia or compression of the Bag equivalent with its gravitational quantum number.

The ellipsoids can be made in other sizes than the length scales (cm or inch) chosen in the present disclosure but this does not change their fundamental geometrical charachteristics which are defined by their here specified semiaxial proportions. Depending on the method of production and the chosen length and size scales, varying order of precision of the actually physically executed proportions of the separate structural Bag models can be achieved.

I claim:

1. A device for producing a model of Baryon states, comprising a body having a permanent form divided into two halves along a plane interface and forming at least one cavity defined by a spheroidal transformation of a homomorphic Euclidean representation of an invariant guage field symmetry of the Baryon, in a root vector lattice corresponding to the analytical symmetry of the three-dimensional, spherical O(3) Lie algebra, said cavity having a symmetry plane in said interface, and further comprising a balloon-like vesicle filled with a given volume of fluid and filling one said cavity.

2. A device as claimed in claim 1 wherein the mass number of the Baryon is obtained from one of the three linearly independent coordinate extensions of said Euclidean representation thereof.

3. A device as claimed in claim 1 wherein the balloon-like vesicle comprises a deformable flexible envelope of spherical ground shape.

* * * * *

UNITED STATES PATENT OFFICE
CERTIFICATE OF CORRECTION

PATENT NO. : 4,452,590
DATED : June 5, 1984
INVENTOR(S) : Erik Y. TRELL

It is certified that error appears in the above-identified patent and that said Letters Patent are hereby corrected as shown below:

Title page, column 2, after *Primary Examiner* listing, insert --*Attorney, Agent, or Firm* — Berman, Aisenberg & Platt--.

Signed and Sealed this

Twenty-fifth Day of December 1984

[SEAL]

Attest:

GERALD J. MOSSINGHOFF

*Attesting Officer*    *Commissioner of Patents and Trademarks*